United States Patent
Cho et al.

(10) Patent No.: US 10,889,599 B2
(45) Date of Patent: Jan. 12, 2021

(54) 1,1-DIBORYLALKYL-1-METAL COMPOUNDS, PREPARATION METHOD THEREOF, AND THEIR APPLICATIONS TOWARD SYNTHESIS OF 1,1-DIBORONATE ESTER COMPOUNDS

(71) Applicant: POSTECH ACADEMY-INDUSTRY FOUNDATION, Pohang-si (KR)

(72) Inventors: Seung Hwan Cho, Pohang-si (KR); Yeosan Lee, Seoul (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 16/283,499

(22) Filed: Feb. 22, 2019

(65) Prior Publication Data

US 2019/0263837 A1     Aug. 29, 2019

(30) Foreign Application Priority Data

Feb. 27, 2018 (KR) .................. 10-2018-0023539
Oct. 1, 2018 (KR) .................. 10-2018-0117151

(51) Int. Cl.
*C07F 5/02*     (2006.01)

(52) U.S. Cl.
CPC ............ *C07F 5/025* (2013.01); *C07F 5/02* (2013.01)

(58) Field of Classification Search
None
See application file for complete search history.

(56) References Cited

FOREIGN PATENT DOCUMENTS

KR     1020180012458 A     2/2018

OTHER PUBLICATIONS

Lee et al. Angew. Chem. Int. Ed. 2018, 57, 12930-12934.*
English Abstract of KR1020180012458 A.

Gen Kanai, et al., Chemistry Letters, vol. 5, pp. 845-848, 1993, The Chemical Society of Japan, 4 pp.
Takeo Watanabe, et al, Stereoselective synthesis of allylic boronates via palladium-catalyzed cross-coupling reaction of Knochel's (dialkoxyboryl)methylzinc reagents with 1-halo-1-alkenes, Journal of Organometallic Chemistry, vol. 444, pp. C1-C3, 1993, 3pp.
Hideaki Yoshino, et al., "Transition-Metal-Catalyzed Sequential Cross-Coupling of Bis(iodozincio)methane and-ethane with Two Different Organic Halides", Chemistry of European Journal, 2006, 12, 721-726.
Nuria Miralles., "Synthesis and reactivity of 1, 1-diborylalkanes towards C—C bond formation and related mechanisms", Advanced Synthesis & Catalysis, 21 pp. 2015.
Rajender Nallagonda, et al., "gem-Diborylalkanes: recent advances in their preparation, transformation and application", Organic & Biomolecular Chemistry, 2018, 16, 5 pp.
Science of Synthesis: Houben-Weyl Methods of Molecular Transformations vol. 6, 3 pp.
Seijiro Matsubara, et al., "Preparation of Dialkoxyborylbis(bromozincio)methane and Its Reaction with Electrophiles", Chemistry Letters, 1999, 2, pp.
Valery Dembitsky, et al., "Recent developments in bisdiborane chemistry: B—C—B, B—C—C—B, B—C=C—B and B—C=C—B compounds", Applied Organometallic Chemistry, 2003, 17, 327-345.
Yeosan Lee, et al., "Generation and Application of (Diborylmethyl)zinc(II) Species: Access to Enantioenriched gem-Diborylalkanes by an Asymmetric Allylic Substitution", Angewandte Chemie International Edition, 6 pp. 2008.
Yukako Shimada, et al., "Preparation of an Arenylmethylzinc Reagent with Functional Groups by Chemoselective Cross-Coupling Reaction of Bis(iodo-zincio)methane with Iodoarenes", Synlett 2015, 26, 2395-2398.

* cited by examiner

*Primary Examiner* — Clinton A Brooks
(74) *Attorney, Agent, or Firm* — Cantor Colburn LLP

(57) ABSTRACT

The present invention relates to a 1,1-diborylalkyl-1-metal compound including one metal group together with two identical boron groups at the $sp^3$ carbon center, and its use. Specifically, the present invention relates to development of novel organic reactions, synthesis of functional molecules, and synthesis of new drugs by applying the novel 1,1-diboryl-1-metal substituted alkyl compounds to various molecular libraries which could not be synthesized by conventional methodologies.

20 Claims, No Drawings

1,1-DIBORYLALKYL-1-METAL COMPOUNDS, PREPARATION METHOD THEREOF, AND THEIR APPLICATIONS TOWARD SYNTHESIS OF 1,1-DIBORONATE ESTER COMPOUNDS

CROSS-REFERENCE TO RELATED APPLICATION

This application claims priority to and the benefit of Korean Patent Application No. 10-2018-0023539 filed in the Korean Intellectual Property Office on Feb. 27, 2018 and Korean Patent Application No. 10-2018-0117151 filed in the Korean Intellectual Property Office on Oct. 1, 2018, the entire contents of which are incorporated herein by reference.

BACKGROUND OF THE INVENTION

(a) Field of the Invention

The present invention relates to new 1,1-diborylalkyl-1-metal compounds, preparation methods thereof, and their application in synthesis of 1,1-diboronate ester compounds.

(b) Description of the Related Art

A transition-metal-catalyzed cross-coupling reaction is one of potential and reliable carbon-carbon bond-forming reactions. For example, pharmacologically active ingredients of a drug such as losartan ((2-butyl-4-chloro-1-{[2'-(1H-tetrazol-5-yl)biphenyl-4-yl]methyl}-1H-imidazol-5-yl)methanol) used in the treatment of hypertension and atazanavir (methyl N-[(1S)-1-{[(2S,3S)-3-hydroxy-4-[2S-2-[(methoxycarbonyl)amino]-3,3-dimethyl-N'-{[4-(pyridin-2-yl)phenyl]methyl}butanhydrazido]-1-phenylbutan-2-yl]carbamoyl}-2,2-dimethylpropyl]carbamate) used in the treatment of HIV are synthesized through a transition-metal-catalyzed cross-coupling reaction. Recently, a new protocol for providing a complex molecule by repeated or sequential transformation through a transition-metal-catalyzed cross-coupling reaction has been actively studied. Matsubara and Utimoto, for example, reported preparation method for 1,1-dizincborylmethane and their use in synthesis of highly functionalized molecules via palladium-catalyzed Negishi cross-coupling followed by copper-catalyzed allylation (see the following reaction scheme).
(Matsubara and Utimoto)

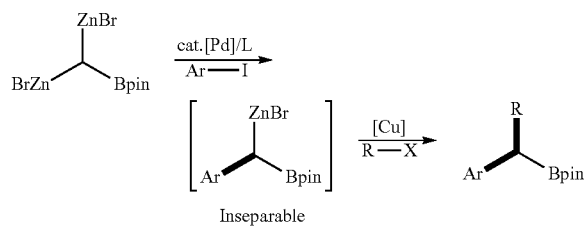

The aforementioned Negishi cross-coupling reaction suggested two individual ZnBr substituents at identical $sp^3$ carbon which eventually act as reactive sites for formation of two C—C bonds. However, the intermediate of which one of the ZnBr moiety is consumed to the C—C bond formation is unstable toward moisture and difficult to separate. Therefore, it is limited to use the intermediate as an isolated reagent, or to prepare in mass scale. To summarize, repeated or sequential transformation of trisubstituted organometallic compounds having three or more reactive sites along with counter metal moiety has been rarely studied.

PRIOR ARTS

Non-Patent Document (Non-patent Document 1) Shimada, Y.; Haraguchi, R.; Matsubara, S. Synlett 2015, 26, 2395-2398.

(Non-patent Document 2) Yoshino, H.; Toda, N.; Kobata, M.; Ukai, K.; Oshima, K.; Utimoto, K.; Matsubara, S. Chem. Eur. J. 2006, 12, 721-726.

SUMMARY OF THE INVENTION

The invention herein provides new trisubstituted organoboron compounds which can offer repeated or sequential transformations such as transition-metal-catalyzed cross-coupling reaction, allylic substitution reaction, and so on.

In an embodiment, a compound represented by Chemical Formula 1 is provided.

[Chemical Formula 1]

In Chemical Formula 1, $R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

the alkyl, the alkoxy, and the ring formed by linking with each other of $R_{41}$ and $R_{42}$ and the alkyl, the alkoxy, the alkenyl, the alkynyl, the cycloalkyl, the heterocycloalkyl, the aryl, and the heteroaryl of $R_3$ may independently be further substituted with at least one substituent selected from a halogen, a hydroxy, a cyano, a C1-C30 alkyl, a C1-C30 haloalkyl, a C1-C30 alkoxy, a C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ independently include at least one heteroatom selected from B, N, O, S, Se, —P(=O)—, —C(=O)—, Si, and P.

The $R_1$ and $R_2$ are independently a hydroxyboronyl, a pinacolboronyl ester, a 2-pyrazol-5-yl aniline boronyl, a benzo[1,3,2]dioxaborole, or a 2,3-dihydro-1H-naphtho[1,8-de][1,3,2]diazaborinine.

The compound may be, for example, represented by Chemical Formula 9.

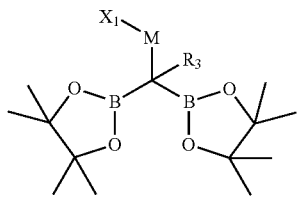

[Chemical Formula 9]

In Chemical Formula 9, $R_3$ is hydrogen, a C1-C30 alkyl, a C2-C30 alkenyl, a C3-C30 cycloalkyl, or a C3-C30 heterocycloalkyl;

M is a zinc group metal;

$X_1$ is a halogen;

the alkyl, the alkenyl, the cycloalkyl, or the heterocycloalkyl of $R_3$ is further substituted with at least one substituent selected from a halogen, a hydroxy, a cyano, a C1-C30 alkyl, a C1-C30 haloalkyl, a C3-C30 cycloalkyl, a C3-C30 heterocycloalkyl, a C6-C30 aryl, and a C2-C30 heteroaryl; and the heterocycloalkyl and the heteroaryl of $R_3$ independently include at least one heteroatom selected from B, N, O, S, Se, —P(=O)—, —C(=O)—, Si, and P.

$R_3$ is hydrogen, a C1-C7 alkyl, or a C2-C7 alkenyl, and the alkyl or the alkenyl of $R_3$ may be further substituted with at least one substituent selected from a C1-C7 alkyl, a C1-C7 haloalkyl, a C3-C12 cycloalkyl, a C3-C12 heterocycloalkyl, a C6-C12 aryl, and a C6-C12 heteroaryl.

M may be Zn.

$X_1$ may be Br or Cl.

$M$-$X_1$ may be Zn—Br or Zn—Cl.

In another embodiment, a method of preparing the compound represented by Chemical Formula 1 is provided.

The preparing method may include performing a dehydrogenation reaction of a compound of Chemical Formula 6 under a lithium base to prepare a compound of Chemical Formula 7, and reacting the compound of Chemical Formula 7 with a compound of Chemical Formula 8.

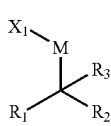

[Chemical Formula 1]

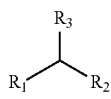

[Chemical Formula 6]

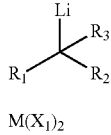

[Chemical Formula 7]

$M(X_1)_2$

[Chemical Formula 8]

In Chemical Formulae 1 and 6 to 8, $R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

the alkyl, the alkoxy, and the ring formed by linking with each other of $R_{41}$ and $R_{42}$ and the alkyl, the alkoxy, the alkenyl, the alkynyl, the cycloalkyl, the heterocycloalkyl, the aryl, and the heteroaryl of $R_3$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ independently include at least one heteroatom selected from B, N, O, S, Se, —P(=O)—, —C(=O)—, Si, and P.

The lithium base may be selected from butyl lithium, lithium dicyclohexylamide, lithium tetramethylpiperidide, lithium isopropylcyclohexylamide, and lithium diisopropylamide.

In another embodiment, reaction between a halogenated aromatic compound or a halogenated vinyl compound; a compound of Chemical Formula 1; and a monodentate ligand-containing transition metal compound under solvent is described to provide preparation method of 1,1-diboronate esters of Chemical Formula 2.

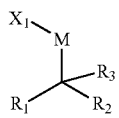

[Chemical Formula 1]

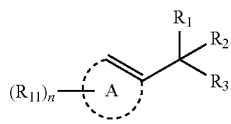

[Chemical Formula 2]

In Chemical Formulae 1 and 2, $R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

A is not present or is an aromatic ring;

$R_{11}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—Si($R_{31}$)$_3$, or —C(O)—$R_{32}$, wherein $R_{31}$ and $R_{32}$ are independently hydrogen, a hydroxy, a C1-C30 alkyl, or a C1-C30 alkoxy;

n is an integer ranging from 1 to 3, and when n is 2 or 3, each $R_{11}$ may be the same or different;

the alkyl, the alkoxy, and the ring formed by linking with each other of $R_{41}$ and $R_{42}$, the alkyl, the alkoxy, the alkenyl, the alkynyl, the cycloalkyl, the heterocycloalkyl, the aryl, and the heteroaryl of $R_3$, the aromatic ring of A, and the alkyl, the alkoxy, the alkenyl, the alkynyl, the aryl, and the heteroaryl of $R_{11}$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and the heteroaryl of $R_{11}$ may independently include at least one heteroatom selected from B, N, O, S, Se, —P(=O)—, —C(=O)—, Si, and P.

The reaction may be performed at about 25° C. to about 100° C.

The monodentate ligand-containing transition metal compound may be a composite of a compound selected from [Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$][BF$_4$]$_2$, Pd$_2$(dba)$_3$, and [Pd(C$_3$H$_5$)Cl]$_2$, and a phosphine-based compound.

The phosphine-based compound may be selected from triphenylphosphine, tri-ortho-tolyl phosphine, tri-meta-tolyl phosphine, tri-para-tolyl phosphine, tris(4-trifluoromethylphenyl) phosphine, diphenyl(para-tolyl) phosphine, cyclohexyldiphenyl phosphine, tris(2,6-dimethoxyphenyl) phosphine, tris(4-methoxyphenyl) phosphine, trimesitylphosphine, tris-3,5-xylylphosphine, tricyclohexyl phosphine, tribenzyl phosphine, benzyldiphenyl phosphine, and diphenyl-normal-propyl phosphine.

In addition, reaction between compound of Chemical Formula 5; compound of Chemical Formula 1; and monodentate ligand-containing transition metal compound is described to provide preparation method of 1,1-diboronate esters of Chemical Formula 4.

[Chemical Formula 1]

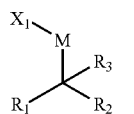

[Chemical Formula 4]

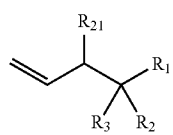

[Chemical Formula 5]

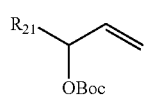

In Chemical Formulae 1, 4, and 5, $R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

$R_{21}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—Si($R_{31}$)$_3$, or —C(O)—R$_{32}$, wherein $R_{31}$ and $R_{32}$ are independently hydrogen, a hydroxy, a C1-C30 alkyl, or a C1-C30 alkoxy;

Boc is tert-butoxycarbonyl;

the alkyl, the alkoxy, and the ring formed by linking with each other of $R_{41}$ and $R_{42}$ and the alkyl, the alkoxy, the alkenyl, the alkynyl, the cycloalkyl, the heterocycloalkyl, the aryl, and the heteroaryl of $R_3$, and the alkyl, the alkoxy, the alkenyl, the alkynyl, the aryl, and the heteroaryl of $R_{21}$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and heteroaryl of $R_{21}$ independently include at least one heteroatom selected from B, N, O, S, Se, —P(=O)—, —C(=O)—, Si, and P.

The reaction may be performed at about 10° C. to about 35° C.

The monodentate ligand-containing transition metal compound may be a composite of a compound selected from Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$][BF$_4$]$_2$, Pd$_2$(dba)$_3$, and [Pd(C$_3$H$_5$)Cl]$_2$, with an aminophosphone-based compound.

The aminophosphone-based compound may be the following L1.

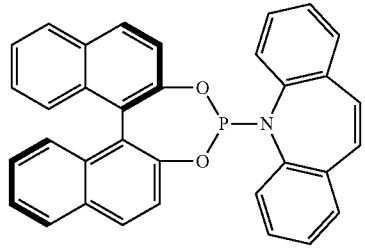

L1

$R_1$ and $R_2$ may independently be hydroxyboronyl, pinacolboronyl ester, 2-pyrazol-5-yl aniline boronyl, benzo[1,3,2]dioxaborole, or 2,3-dihydro-1H-naphtho[1,8-de][1,3,2]diazaborinine.

The solvent may be selected from aprotic solvents.

According to the present invention, various organic reactions such as transition-metal-catalyzed cross-coupling reactions, allylic substitution reactions, and the like under very mild process conditions may be performed. The organic reaction does not need complicated process conditions such as strong acid or strong base conditions, low temperature reaction conditions, anhydrous conditions, and the like, and thus may be economical.

In addition, the present invention may provide a 1,1-diboronate ester compound with high stereoselectivity, optical purity and yield, as the reaction is performed from the transition metal catalyst and a organoboron compound including one metal group along with two identical boron groups at the same sp$^3$-carbon.

In addition, the use of trisubstituted organoboron compounds can provide a novel protocol for repeated or sequential transformation such as transition metal-catalyzed cross-coupling reaction, allylic substitution reaction, and the like, which leads to excellent commercial practicality.

In summary, the invention offers 1,1-diboronate esters from the trisubstituted organoboron compounds, which could offer vast range of derivatives by novel synthetic methods. The applications are expected to be extended to various fields in organic synthetic methodologies as well.

DETAILED DESCRIPTION OF THE EMBODIMENTS

Hereinafter, the present invention will be described in more detail. Unless otherwise defined, technical and scientific terms used herein have the same meaning as commonly understood by a person skilled in the art to which this invention belongs. Unnecessary descriptions of known functions or configurations are omitted to avoid blurring the gist in the following content.

In the terms in this specification, the "trisubstituted organoboron compound" refers to a compound of Chemical Formula 1, and hereinafter, may have the same meaning as a trisubstituted organic reaction reagent or a 1,1-diborylalkyl-1-metal compound.

As used herein, the term "an alkyl-containing substituent other than "alkyl", "alkoxy," etc." refers to an organic radical derived from hydrocarbons in a straight or branched form. In addition, the alkyl and alkyl-containing substituent according to the present invention may have a C1 to C7 single chain, and may be desirably selected from methyl, ethyl, propyl, and butyl, but is not limited thereto. In addition, the alkoxy refers to *—O-alkyl.

As used herein, the term "alkenyl" refers to an organic radical derived from a hydrocarbon in the form of a straight or branched chain including at least one double bond, and the term "alkynyl" refers to a straight or branched chain hydrocarbon including at least one triple bond.

As used herein, the term "cycloalkyl" refers to a free radical derived from a fully saturated or partially unsaturated hydrocarbon ring of C3 to C9 carbon atoms, and may include the case where an aryl or heteroaryl is fused therewith. The term "heterocycloalkyl" refers to a free radical derived from a monocyclic or polycyclic non-aromatic ring including 3 to 9 ring atoms including at least one heteroatom selected from B, N, O, S, Se, —P(=O)—, —C(=O)—, Si, and P.

As used herein, the term "aryl" refers to an organic radical derived from aromatic hydrocarbons by removing one single hydrogen, and may suitably include single or fused ring systems including 4 to 7, desirably 5 or 6, cyclic atoms in each cycle, and may also include a plurality of aryls linked by a single bond. For example, it may include phenyl, naphthyl, biphenyl, terphenyl, anthryl, indenyl, fluorenyl, phenanthryl, triphenylenyl, pyrenyl, perylenyl, chrycenyl, naphthacenyl, or fluoranthenyl, but is not limited thereto.

As used herein, the term "heteroaryl" refers to organic radicals derived from aromatic hydrocarbons by removing one hydrogen, may be an organic radical derived from monocyclic or polycyclic aromatic hydrocarbons including 4 to 7 cyclic atoms including at least one heteroatom selected from B, N, O, S, Se, —P(=O)—, —C(=O)—, Si, and P, and may include single or fused ring systems including 4 to 7, desirably 5 or 6, cyclic atoms, and may also include a plurality of heteroaryls linked by a single bond. Examples thereof may include monocyclic heteroaryls such as furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like; polycyclic heteroaryls such as benzofuranyl, benzothiophenyl, isobenzofuranyl, benzoimidazolyl, benzothiazolyl, benzoisothiazolyl, benzoisoxazolyl, benzoxazolyl, isoindolyl, indolyl, indazolyl, benzothiadiazolyl, quinolyl, isoquinolyl, cinnolinyl, quinazolinyl, quinolizinyl, quinoxalinyl, carbazolyl, phenanthridinyl, benzodioxolyl, and the like; but are not limited thereto.

As used herein, the term "halogen" refers to fluorine (F), chlorine (Cl), bromine (Br), or iodine (I) atoms.

As used herein, the term "cyclic" refers to an alicyclic or aromatic ring formed by linking by a C1-C10 alkylene or a C2-C10 alkenylene. One or two or more of the carbon atoms of the alkylene or alkenylene forming the rings may be replaced by one or more of B, N, O, S, Se, —P(=O)—, —C(=O)—, Si, and P to form an alicyclic or aromatic ring including a heteroatom.

In addition, as used herein, the term "aromatic ring" refers to an aryl or a heteroaryl linked by a C2-C10 alkenylene.

The present inventors repeatedly conducted studies to provide a new protocol for repeated or sequential transformation such as a transition metal-catalyzed cross-coupling reaction, an allylic substitution reaction, etc., using a trisubstituted organic reaction reagent including a disubstituted boron group and a monosubstituted metal group at the sp$^3$ carbon, that is, the trisubstituted organoboron compound. As a result, a new compound, namely a trisubstituted organic reaction reagent, which includes one metal group along with two identical boron groups at the same sp$^3$ carbon center, has been designed. In addition, the present inventors a new protocol for a repeated or sequential transformation such as a transition metal-catalyzed cross-coupling reaction or an allylic substitution reaction, that is, a novel reaction mechanism.

The present invention should be noted that the present disclosure proposes a new protocol related to compatibility with catalysts, starting materials (for example, a compound of Chemical Formula 1), intermediates, solvents, reaction conditions, and the like. As used herein, the organoboron compound specifically refers to a compound including one metal groups along with two identical boron groups at the sp$^3$ carbon center, and hereinafter may also be referred to as a 1,1-diborylalkyl-1-metal compound or a compound of Chemical Formula 1.

The protocol according to the present invention may provide high stereoselectivity, yield and optical purity regardless of the kind of the substituent of the organoboron compound. In addition, the protocol according to the present invention may also provide a useful approach to asymmetric transformation using a transition metal catalyst. That is, the present invention provides a new trisubstituted organic reaction reagent including one metal group along with two identical boron groups at the sp$^3$ carbon center, and its application may be extended.

The 1,1-diborylalkyl-1-metal compound according to an embodiment may be represented by Chemical Formula 1.

[Chemical Formula 1]

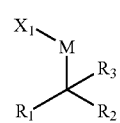

In Chemical Formula 1,
$R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

R$_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

X$_1$ is a halogen;

the alkyl, the alkoxy, and the ring formed by linking with each other of R$_{41}$ and R$_{42}$ and the alkyl, the alkoxy, the alkenyl, the alkynyl, the cycloalkyl, the heterocycloalkyl, the aryl, and the heteroaryl of R$_3$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of R$_3$ independently include at least one heteroatom selected from B, N, O, S, Se, —P(=O)—, —C(=O)—, Si, and P.

M of Chemical Formula 1 may be a zinc group metal, for example zinc (Zn) as described above.

In Chemical Formula 1, when M is the zinc group metal, it may exhibit unique reactivity in the transition metal-catalyzed cross-coupling reaction, the allylic substitution reaction, and the like which will be described later. Therefore, since the organic reaction using Chemical Formula 1 may be applied to the repeated or sequential modification through the 1,1-diboronate ester compound, it is possible to produce complex compounds that could not be synthesized from conventional metal substituted compounds.

Details related to this will be described later.

In an embodiment, the 1,1-diborylalkyl-1-metal compound may be represented by Chemical Formula 9.

[Chemical Formula 9]

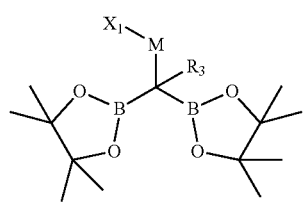

In Chemical Formula 9, M and X$_1$ are described as described above, and

R$_3$ may be hydrogen, a C1-C30 alkyl, a C2-C30 alkenyl, a C3-C30 cycloalkyl, or a C3-C30 heterocycloalkyl.

Since pinacol boronyl ester (Bpin) is a very stable site for a reaction, it is stable in moisture and easy to handle, and may be expanded to a large scale. It may be used for a variety of formation of carbon-carbon bond, carbon-oxygen bond, and carbon-nitrogen bond using an organic metal catalyst, and thus an application range is wide.

Particularly, when two pinacolboronyl esters are included, one pinacol boronyl ester acts as a reactive site, and thus, a compound having one C—C bond may be separated in a stable state and may be prepared as a sequential product, the compound may be used as a reaction product of another reaction, and it is easy to expand to a large scale by applying it. On the other hand, when two functional moieties are metal halides (e.g., ZnBr), a compound in which one ZnBr acts as a reactive site and one C—C bond is formed is unstable to moisture and difficult to separate.

More specifically, R$_3$ may be hydrogen, a C1-C7 alkyl, or a C2-C7 alkenyl, and the alkyl or the alkenyl of R$_3$ may be further substituted with at least one substituent selected from a C1-C7 alkyl, a C1-C7 haloalkyl, a C3-C12 cycloalkyl, a C3-C12 heterocycloalkyl, a C6-C12 aryl, and a C6-C12 heteroaryl.

R$_1$ and R$_2$ may independently be hydroxyboronyl, pinacolboronyl ester, 2-pyrazol-5-yl aniline boronyl, benzo[1,3,2]dioxaborole, or 2,3-dihydro-1H-naphtho[1,8-de][1,3,2]diazaborinine.

X$_1$ may be Br or Cl, and

M-X$_1$ may be Zn—Br or Zn—Cl.

The 1,1-diborylalkyl-1-metal compound according to another embodiment may be prepared by a method including performing a dehydrogenation of a compound of Chemical Formula 6 under a lithium base to prepare a compound of Chemical Formula 7, and reacting the compound of Chemical Formula 7 with a compound of Chemical Formula 8.

[Chemical Formula 1]

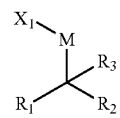

[Chemical Formula 6]

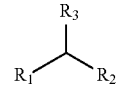

[Chemical Formula 7]

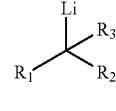

[Chemical Formula 8]

M(X$_1$)$_2$

In Chemical Formulae 1 and 6 to 8, R$_1$ to R$_3$, M, and X$_1$ are the same as described above.

In the method of preparing the compound of Chemical Formula 1 according to an embodiment of the present disclosure, the compound of Chemical Formula 6 may be activated with a lithium base and then may be reacted with the compound of Chemical Formula 8.

For example, a form of the compound of Formula 6 activated by the lithium base may be the compound of Formula 7, and in the present invention, the compound of Formula 7 may be reacted with the compound of Chemical Formula 8 as an isolable independent reactant.

The present inventors found that, in the preparation of the compound of Chemical Formula 1, participation of the compound of Chemical Formula 7 as an independent reactant in the reaction may have a significant effect on reaction selectivity.

For example, in the allylic substitution reaction using Chemical Formula 1, when the compound of Chemical Formula 7 participates in the reaction as an independent reactant (Case I) and participates in an in-situ reaction (Case II), it has been confirmed that there is a remarkable difference in terms of product selectivity.

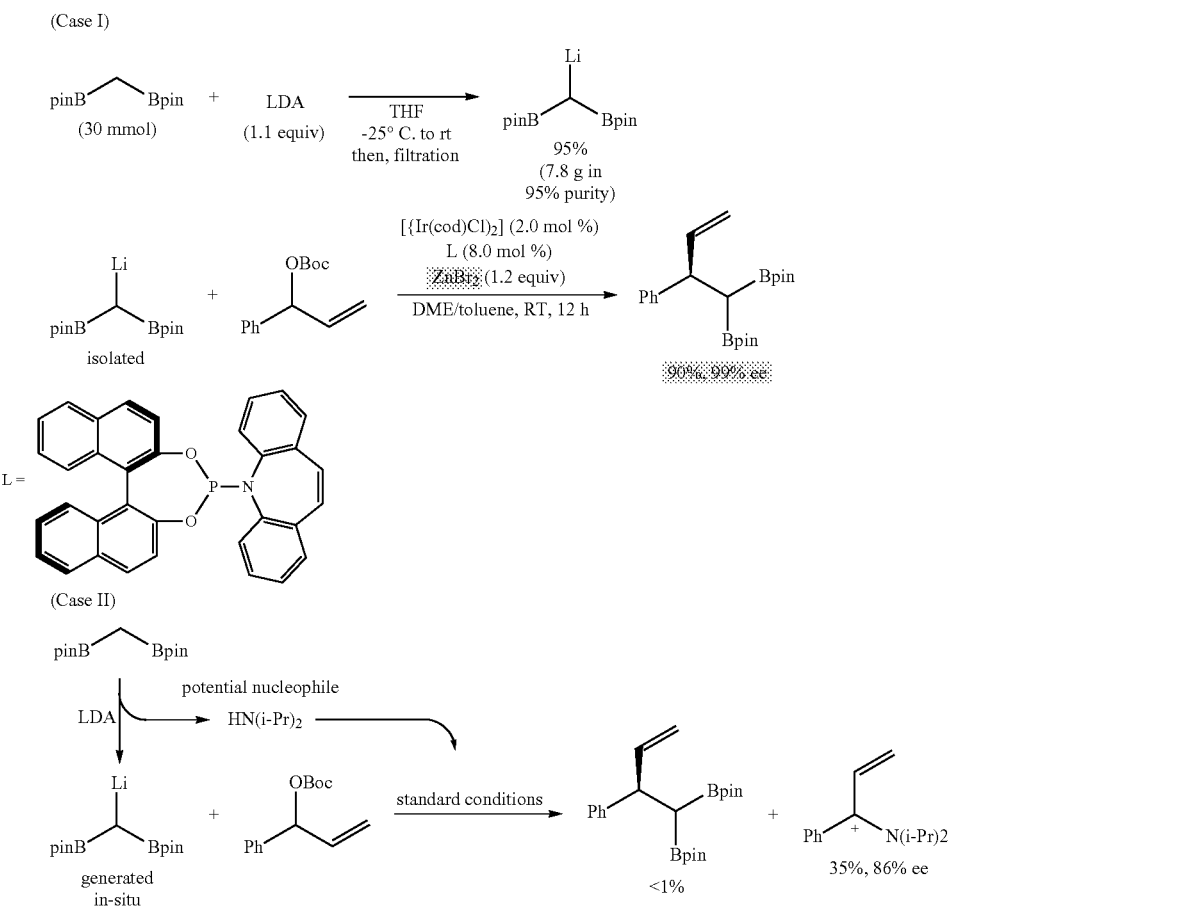

That is, in Case I, an asymmetric allylic alkylation reaction occurs only through the intermediates of Chemical Formula 1 while the compound of Chemical Formula 7 participates in the reaction as an independent reactant, whereas in Case II, the compound of Chemical Formula 7 reacts in-situ and thus it is confirmed that an allylic amination reaction proceeded competitively, resulting in the predominance of the allylic amination.

From this, it may be seen that it is an important reaction condition to participate in the reaction of the compound of Chemical Formula 7 as the independent reactant in order to selectively proceed only the allylic alkylation reaction through Chemical Formula 1.

For example, the lithium base is not limited as long as it is a conventional material, and specific examples thereof may include those selected from butyl lithium, lithium dicyclohexylamide, lithium tetramethylpiperidide, lithium isopropylcyclohexylamide, and lithium diisopropylamide. In this case, the lithium base may be used alone or in a mixture of two or more.

Another embodiment provides a method of preparing a 1,1-diboronate ester compound represented by Chemical Formula 2 using the compound of Chemical Formula 1.

A method of preparing the 1,1-diboronate ester compound according to an embodiment of the present disclosure may include reacting a halogenated aromatic compound or a halogenated vinyl compound; a compound of Chemical Formula 1; and a monodentate ligand-containing transition metal compound under a solvent to prepare a compound of Chemical Formula 2.

[Chemical Formula 1]

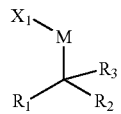

[Chemical Formula 2]

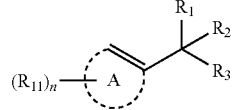

In Chemical Formulae 1 and 2, $R_1$ and $R_2$ are independently *—$B(R_{41})(R_{42})$, wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

A is not present or is an aromatic ring;

$R_{11}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—$Si(R_{31})_3$, or —C(O)—$R_{32}$, wherein $R_{31}$ and $R_{32}$ are independently hydrogen, a hydroxy, a C1-C30 alkyl, or a C1-C30 alkoxy;

n is an integer ranging from 1 to 3, and when n is 2 or 3, each $R_{11}$ may be the same or different;

the alkyl, the alkoxy, and the ring formed by linking with each other of $R_{41}$ and $R_{42}$, the alkyl, the alkoxy, the alkenyl, the alkynyl, the cycloalkyl, the heterocycloalkyl, the aryl, and the heteroaryl of $R_3$, the aromatic ring of A, and the alkyl, the alkoxy, the alkenyl, the alkynyl, the aryl, and the heteroaryl of $R_{11}$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and the heteroaryl of $R_{11}$ may independently include at least one heteroatom selected from B, N, O, S, Se, —P(=O)—, —C(=O)—, Si, and P.

For example, when A of Chemical Formula 2 is not present, it may be a compound of Chemical Formula 2-1.

[Chemical Formula 2-1]

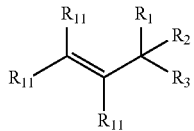

In Chemical Formula 2-1, the definitions of the substituents are the same as in Chemical Formula 2.

For example, M of Chemical Formula 1 may be Zn.

The method of preparing the 1,1-diboronate ester compound according to an embodiment of the present disclosure is affected by starting materials (e.g., the compound of Chemical Formula 1), catalysts, solvents, reaction temperature conditions, and the like.

Hereinafter, reaction conditions affecting the method according to the present invention will be described in detail.

In the compound of Chemical Formula 1, specifically, $R_1$ and $R_2$ may independently be *—B($R_{41}$)($R_{42}$), wherein $R_{41}$ and $R_{42}$ are independently hydrogen, a hydroxyl, or a C1-C30 alkoxy, or are linked with each other to form a ring. Herein, the ring may be substituted or unsubstituted.

In the compound of Chemical Formula 1, specifically, $R_1$ and $R_2$ may independently be hydroxyboronyl, pinacolboronyl ester, 2-pyrazol-5-yl aniline boronyl, benzo[1,3,2]dioxaborole, or 2,3-dihydro-1H-naphtho[1,8-de][1,3,2]diazaborinine.

The compound of Chemical Formula 1 may specifically be a compound represented by Chemical Formula 9.

[Chemical Formula 9]

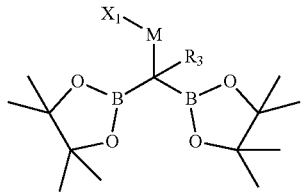

In Chemical Formula 9, $R_3$ is hydrogen, a C1-C30 alkyl, a C2-C30 alkenyl, a C3-C30 cycloalkyl, or a C3-C30 heterocycloalkyl;

M is a zinc group metal;

$X_1$ is a halogen; and the alkyl, the alkenyl, the cycloalkyl, or the heterocycloalkyl of $R_3$ is further substituted with at least one substituent selected from a halogen, a hydroxy, a cyano, a C1-C30 alkyl, a C1-C30 haloalkyl, a C3-C30 cycloalkyl, a C3-C30 heterocycloalkyl, a C6-C30 aryl, and a C2-C30 heteroaryl, and the heterocycloalkyl and the heteroaryl of $R_3$ independently include at least one heteroatom selected from B, N, O, S, Se, —P(=O)—, —C(=O)—, Si, and P.

In the compound of Chemical Formula 9, specifically $R_3$ may be hydrogen, a C1-C7 alkyl, or a C2-C7 alkenyl, and the alkyl or the alkenyl of $R_3$ may be further substituted at least one substituent selected from a C1-C7 alkyl, a C1-C7 haloalkyl, a C3-C12 cycloalkyl, a C3-C12 heterocycloalkyl, a C6-C12 aryl, and a C6-C12 heteroaryl.

In the compound of Chemical Formula 9, specifically, $R_3$ may be hydrogen, a C1-C3 alkyl, or a C2-C3 alkenyl, and the alkyl or the alkenyl of $R_3$ may be further substituted at least one substituent selected from a C1-C7 alkyl, a C3-C10 cycloalkyl, a C3-C10 heterocycloalkyl, a C6-C10 aryl, and a C6-C10 heteroaryl.

In the compounds of Chemical Formula 1 or Chemical Formula 9, M may be zinc.

In the method of preparing the 1,1-diboronate ester compound according to an embodiment of the present disclosure, the compound of Chemical Formula 1 may be used in an amount of about 1.0 mol to about 5.0 mol, specifically about 1.0 mol to about 3.0 mol, and more specifically about 1.0 mol to about 2.0 mol, based on 1 mol of the halogenated aromatic compound or halogenated vinyl compound.

The halogenated aromatic compound may be represented by Chemical Formula 3-1, and the halogenated vinyl compound may be a compound represented by Chemical Formula 3-2.

[Chemical Formula 3-1]

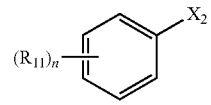

[Chemical Formula 3-2]

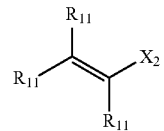

In Chemical Formulae 3-1 and 3-2, $X_2$ is a halogen;

each $R_{11}$ is independently hydrogen, a halogen, a hydroxy, a cyano, a C1-a C30 alkyl, a C1-C30 alkoxy, a C2-C30 alkenyl, a C2-C30 alkynyl, a C6-C30 aryl, a C2-C30 heteroaryl, —O—Si($R_{31}$)$_3$, or —C(O)—$R_{32}$, or are linked with each other to form a ring, wherein each $R_{11}$ may be the same or different, and in the case of Chemical Formula 3-2, all of $R_{11}$ are not hydrogen;

the alkyl, the alkoxy, the alkenyl, the alkynyl, the aryl, and the heteroaryl of $R_{11}$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heteroaryl of $R_{11}$ may independently include at least one heteroatom selected from B, N, O, S, Se, —P(=O)—, —C(=O)—, Si, and P.

The trisubstituted organoboron compound according to the invention and the 1,1-diboronate ester compound prepared through the process according to the invention may be applied to a repeated and sequential transformation to form potentially more complex molecules. That is, the compounds of the present disclosure may be applied to the preparation of various molecular libraries that could not be synthesized by the conventional methodology.

For example, through a coupling reaction of Chemical Formula 3-1 or Chemical Formula 3-2 and Chemical Formula 1 in the presence of a palladium catalyst and a monodentate ligand phosphine ligand, a benzylic 1,1-diboronate ester or allylic 1,1-diboronate ester compound may be prepared with a high yield. The method of preparing the 1,1-diboronate ester compound according to an embodiment of the present disclosure uses a monodentate ligand-containing transition metal compound as a catalyst.

The monodentate ligand-containing transition metal compound may specifically be a composite of a transition metal-containing compound selected from [Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$[BF$_4$]$_2$, Pd$_2$(dba)$_3$, and [Pd(C$_3$H$_5$)Cl]$_2$, with a phosphine-based compound.

For example, the monodentate ligand-containing transition metal compound may be a composite of a palladium-containing compound selected from [Pd(CH$_3$CN)$_4$[BF$_4$]$_2$, Pd$_2$(dba)$_3$, and [Pd(C$_3$H$_5$)Cl]$_2$ with the phosphine-based compound.

For example, the phosphine-based compound may be selected from triphenylphosphine, tri-ortho-tolyl phosphine, tri-meta-tolyl phosphine, tri-para-tolyl phosphine, tris(4-trifluoromethylphenyl) phosphine, diphenyl(para-tolyl) phosphine, cyclohexyldiphenyl phosphine, tris(2,6-dimethoxyphenyl) phosphine, tris(4-methoxyphenyl) phosphine, trimesitylphosphine, tris-3,5-xylylphosphine, tricyclohexyl phosphine, tribenzyl phosphine, benzyldiphenyl phosphine, and diphenyl-normal-propyl phosphine.

As described above, the monodentate ligand-containing transition metal compound according to the present invention includes a material having a monodentate ligand as a ligand compound. For example, when a material having two or more ligands that is not the material having the monodentate ligand is used as a ligand compound, the transition-metal-catalyzed cross-coupling reaction is not performed. These results are expected to affect an oxidative addition reaction due to narrow bonding angles when the ligand binds to the transition metal catalyst.

In the method of preparing the 1,1-diboronate ester compound according to an embodiment of the present disclosure, the monodentate ligand-containing transition metal compound may be added in a form of a composite in which the transition metal-containing compound and the phosphine-based compound are mixed at a mole ratio of 1:5, specifically a mole ratio of 1:3, and more specifically a mole ratio of 1:2.

In addition, in the method of preparing the 1,1-diboronate ester compound according to an embodiment of the present disclosure, the monodentate ligand-containing transition metal compound may be used in an amount of about 0.5 mol % to about 10 mol %, specifically about 0.5 mol % to about 8.0 mol %, and more specifically about 0.5 mol % to about 2.0 mol %, based on 1 mol of the halogenated aromatic compound or the halogenated vinyl compound.

In the method of preparing the 1,1-diboronate ester compound according to an embodiment of the present disclosure, kinds of reaction solvents and reaction temperature conditions may have a significant effect on reactivity.

In the method of preparing the 1,1-diboronate ester compound according to an embodiment of the present disclosure, the solvent may be an aprotic solvent, and particularly, in an embodiment of the present disclosure, tetrahydrofuran may be preferable because a higher yield rate may be realized.

In addition, in the method of preparing the 1,1-diboronate ester compound according to an embodiment of the present disclosure, a use amount of the solvent is not limited, and may be about 10 to about 1000 parts by weight, and more specifically about 10 to about 100 parts by weight, based on 1 part by weight of the halogenated aromatic compound or the halogenated vinyl compound.

In addition, in the method of preparing the 1,1-diboronate ester compound according to an embodiment of the present disclosure, this step may be performed under a weakly warmed condition. That is, the step may be performed under a temperature condition of about 25° C. to about 100° C. When the temperature condition is out of the range, the reaction is not performed, or by-products may be excessively produced in the reaction.

For example, the step may be performed under a temperature condition of about 45° C. to about 80° C. for about 1 hour to 10 hours.

For example, the step may be performed under a temperature condition of about 50° C. to about 80° C. for about 1 hour to 5 hours.

A use of the compound of Chemical Formula 1 according to another embodiment is a method of preparing a 1,1-diboronate ester compound represented by Chemical Formula 4.

A method of preparing a 1,1-diboronate ester compound according to an embodiment of the present disclosure may include reacting a compound of Chemical Formula 5, a compound of Chemical Formula 1, and a monodentate ligand-containing transition metal compound under a solvent to prepare a compound of Chemical Formula 4.

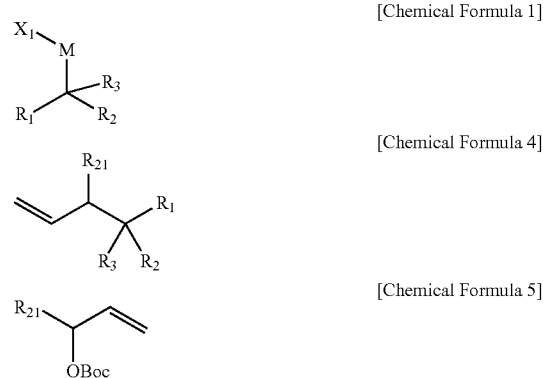

[Chemical Formula 1]

[Chemical Formula 4]

[Chemical Formula 5]

In Chemical Formulae 1, 4, and 5,

R$_1$ and R$_2$ are independently *—B(R$_{41}$)(R$_{42}$), wherein R$_{41}$ and R$_{42}$ are independently hydrogen, a hydroxy, a C1-C30 alkyl, or a C1-C30 alkoxy, or are linked with each other to form a ring;

R$_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

$R_{21}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—Si($R_{31}$)$_3$, or —C(O)—$R_{32}$, wherein $R_{31}$ and $R_{32}$ are independently hydrogen, a hydroxy, a C1-C30 alkyl, or a C1-C30 alkoxy;

Boc is tert-butoxycarbonyl;

the alkyl, the alkoxy, and the ring formed by linking with each other of $R_{41}$ and $R_{42}$, the alkyl, the alkoxy, the alkenyl, the alkynyl, the cycloalkyl, the heterocycloalkyl, the aryl, and the heteroaryl of $R_3$, and the alkyl, the alkoxy, the alkenyl, the alkynyl, the aryl, and the heteroaryl of $R_{21}$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and the heteroaryl of $R_{21}$ may independently include at least one heteroatom selected from B, N, O, S, Se, —P(=O)—, —C(=O)—, Si, and P.

According to the above-described method, an allylic substitution reaction having high enantiomer selectivity may be performed. In addition, in this allylic substitution reaction, enantiomeric selectivity using the trisubstituted organoboron compound corresponds to a conventionally unknown protocol.

That is, according to the present invention, it is possible to obtain the compound of Chemical Formula 4 with enantiomeric excess (ee) at a high yield.

Specifically, Chemical Formula 4 may have stereoselectivity represented by Chemical Formula 4-1.

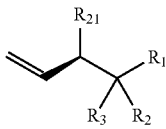

[Chemical Formula 4-1]

In Chemical Formula 4-1, the substituents are the same as in Chemical Formula 4.

In addition, in the method of preparing the 1,1-diboronate ester compound according to an embodiment of the present disclosure, the compound of Chemical Formula 1 may be used as a purified compound, but in the method of preparing the compound of Chemical Formula 1, even if it may be used without additional purification, the same reactivity may be realized. Thus, in the method of preparing the compound of Chemical Formula 1, a yield rate of final products may be improved even when used without additional purification.

For example, a mixture of a compound of Chemical Formula 7, instead of the compound of Chemical Formula 1, and a compound of Chemical Formula 8 is reacted, and then the compound of Chemical Formula 5 and the monodentate ligand-containing transition metal compound are additionally added to prepare the compound of Chemical Formula 4.

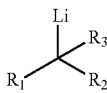

[Chemical Formula 7]

M($X_1$)$_2$  [Chemical Formula 8]

In Chemical Formulae 7 and 8, $R_1$ and $R_2$ are independently *—B($R_{41}$)($R_{42}$), wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

the alkyl, the alkoxy, and the ring formed by linking with each other of $R_{41}$ and $R_{42}$ and the alkyl, the alkoxy, the alkenyl, the alkynyl, the cycloalkyl, the heterocycloalkyl, the aryl, and the heteroaryl of $R_3$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ independently include at least one heteroatom selected from B, N, O, S, Se, —P(=O)—, —C(=O)—, Si, and P.

For example, when the compound of Chemical Formula 4 is prepared, the compound of Chemical Formula 8 may be a metal chloride or a metal bromide.

In addition, in the method of preparing the 1,1-diboronate ester compound according to an embodiment of the present disclosure, a protecting group of Chemical Formula 5 may also have an effect on reactivity.

In addition, a method of preparing the 1,1-diboronate ester compound according to an embodiment of the present disclosure may be affected by starting materials (for example, the compound of Chemical Formula 1), catalysts, solvents, reaction temperature conditions, and the like.

Hereinafter, reaction conditions affecting the method according to the present invention will be described in detail.

The 1,1-diboronate ester compound prepared by the process according to the present invention may be applied to a repeated and sequential transformation to form potentially more complex molecules, and the compound of Chemical Formula 4-1, which is enantiomeric excess (ee), may be provided at a high yield by a selective allylic substitution reaction.

In the method of the 1,1-diboronate ester compound according to an embodiment of the present disclosure, the monodentate ligand-containing transition metal compound is used as a catalyst. Herein, the catalyst includes a ligand that is different from the method of preparing the 1,1-diboronate ester compound represented by Chemical Formula 2.

The monodentate ligand-containing transition metal compound may specifically be a composite of a transition metal-containing compound selected from [Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$[BF$_4$]$_2$, Pd$_2$(dba)$_3$, and [Pd(C$_3$H$_5$)Cl]$_2$, with a ligand compound such as L1.

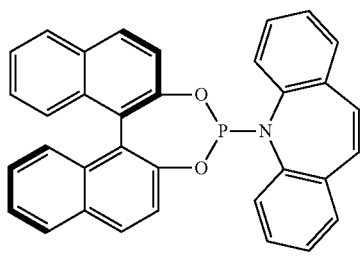

L1

For example, the monodentate ligand-containing transition metal compound may be a composite of an iridium-containing compound selected from [Ir(COD)Cl]$_2$, [Ir(COD)$_2$]X (X=OMe, BF$_4$, ClO$_4$, SbF$_6$, or CF$_3$SO$_3$) and an aminophosphone-based compound. For example, the aminophosphone-based compound may be a chiral ligand.

Particularly, when the L1-containing monodentate ligand-containing transition metal compound is used, an improved reaction yield and ee value may be embodied.

In the method of preparing the 1,1-diboronate ester compound according to an embodiment of the present disclosure, the monodentate ligand-containing transition metal compound may be added in a form of a composite of the transition metal-containing compound and the ligand compound such as L1 at a mole ratio of about 1:10, specifically about 1:8, and more specifically about 1:5.

In addition, in the method of preparing the 1,1-diboronate ester compound according to an embodiment of the present disclosure, the monodentate ligand-containing transition metal compound may be used in an amount of about 1 mol % to about 10 mol %, specifically about 1.0 mol % to about 8.0 mol %, and more specifically about 3.0 mol % to about 8.0 mol %, based on 1 mol of the compound of Chemical Formula 5.

In the method of the 1,1-diboronate ester compound according to an embodiment of the present disclosure, kinds of reaction solvents and reaction temperature conditions may have a significant effect on reactivity.

In the method of preparing the 1,1-diboronate ester compound according to an embodiment of the present disclosure, the solvent may be an aprotic solvent, and particularly is toluene, dimethylether, tetrahydrofuran, and the like, a higher yield rate, stereoselectivity, and high optical purity may be embodied. In addition, when two or more mixed solvents are used rather than using the above-mentioned solvents alone, more improved reactivity may be obtained.

In addition, in the method of preparing the 1,1-diboronate ester compound according to an embodiment of the present disclosure, a use amount of the solvent is not limited, and may be about 10 to about 1000 parts by weight, and more specifically about 10 to about 100 parts by weight, based on 1 part by weight of the compound of Chemical Formula 5.

In addition, in the method of preparing the 1,1-diboronate ester compound according to an embodiment of the present disclosure, a reaction at the step may be performed in a low temperature condition. Specifically, the step may be performed under a temperature condition of about 10° C. to about 35° C. When the temperature condition is out of the range, the reaction is not performed, or by-products may be excessively produced in the reaction.

For example, the step may be performed under a temperature condition of about 10° C. to about 30° C. for about 5 hours to about 20 hours.

As another example, the step may be performed under a temperature condition of about 20° C. to about 30° C. for about 8 hours to about 16 hours.

Hereinafter, the present invention will be described more specifically through examples.

Prior to this, terms and words used in the present specification and claims should not be construed as limited to ordinary or dictionary terms, and the present invention should be construed with meanings and concepts that are consistent—with the technical idea of the present disclosure based on the principle that the inventors may appropriately define concepts of the terms to appropriately describe their own invention in the best way. Therefore, embodiments described in the present specification and configurations shown in the drawings are only the most preferred embodiments of the present disclosure, and are not intended to represent all of the technical ideas of the present disclosure. Therefore, it should be understood that there are numerous equivalents and variations.

Unless otherwise described, syntheses of all compounds was performed using a standard Schlenk flask and a glove box under a nitrogen atmosphere, and the organic solvent used in the reaction was refluxed under sodium metal and benzophenone to remove moisture and degassed by distillation immediately before use. The glassware used were also made into an anhydrous state by heating the same in an oven at 130° C. for one day before being put in a glove box. $^1$H-NMR analysis of the synthesized compound was performed using Bruker 500 MHz equipment at room temperature. The optical selectivity (ee) of the synthesized compounds was also analyzed using gas chromatography.

Example 1

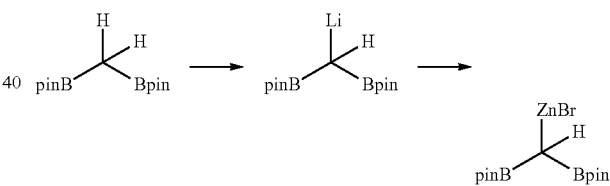

Step 1.

1,1-diboronate ester (CH$_2$(Bpin)$_2$, 20 mmol, 5.4 g) and a stirring magnet were put in a 100 mL round-bottomed flask. Subsequently, a lithium diisopropyl amide solution (1 molar concentration, a tetrahydrofuran/hexane solvent, 1.1 eq, 22 mL) cooled down to −25° C. was slowly injected into the 100 mL round-bottomed flask, while slowly being stirred. During the injection, a white solid was rapidly produced in the solution, and then the mixture was stirred quickly at room temperature for 20 minutes. The produced solid was filtered under decompression with a glass filter. The filtered white solid was washed through decompression filtration by pouring 50 mL of hexane therein, and then moved to a 100 mL flask. Then, 50 mL of a tetrahydrofuran solvent was added to this flask, the obtained mixture was stirred for 10 minutes, the solid was settled to the bottom for 10 minutes, and only an upper liquid was removed with a pipette. The solid was washed repeatedly three times with tetrahydrofuran, and lastly, washed once with 50 mL of hexane. In order to remove an organic solvent remaining in the solid, the solid was allowed to stand for 12 hours at room temperature under an extremely low pressure. A very fine white solid product which was purified at room temperature is 1,1-diborylmethyl lithium (yield: 5.0 g, 92%). Herein, the 1,1-diborylmethyl lithium was used in the next step without additional purification.

Step 2.

The 1,1-diboryl methyl lithium (1.0 eq, 0.24 mmol, 54 mg) prepared in Step 1 and zinc bromide (1.0 eq, 0.24 mmol, 66 mg) were put in a 4-dram vial, 0.24 ml of tetrahydrofuran was added thereto, and the obtained mixture was stirred for 30 minutes to prepare a 1,1-diboryl methyl zinc bromide solution.

$^1$H-NMR (500 MHz, $d_8$-THF) [ppm] δ=1.22 (s, 6H), 1.21 (s, 6H), 0.47 (s, 1H).

Example 2

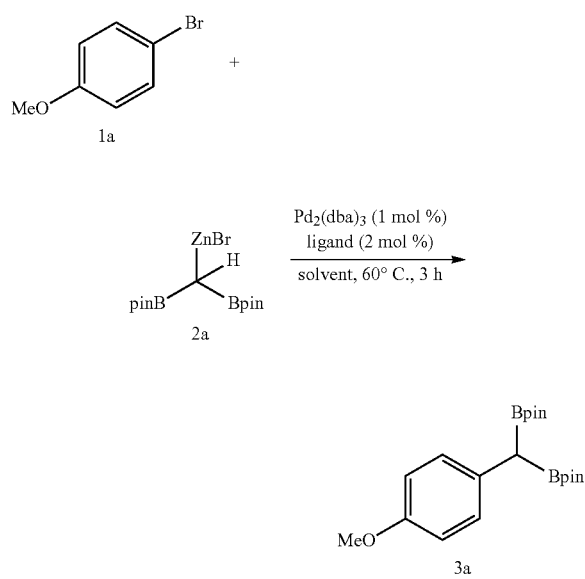

Anhydrous zinc bromide (1.2 eq, 0.24 mmol, 54 mg) and the purified 1,1-diboryl methyl lithium (1.2 eq, 0.24 mmol, 66 mg) were added to a 4-dram vial, tetrahydrofuran (0.24 mL, 1M) was added thereto, a stirring magnet was immersed therein, and the mixture was stirred for 30 minutes to prepare a 1,1-diborylmethylzinc bromide solution. Subsequently, tris(dibenzylideneacetone)dipalladium (0) (1.0 mol %, 1.8 mg) and a ligand (triphenylphosphine) (2.0 mol %, 1.2 mg) were put in another 4-dram vial, and substrate of 4-bromoanisole (0.2 mmol, 37 mg) and tetrahydrofuran (0.5 mL) were added thereto. After immersing a stirring magnet therein, the prepared 1,1-diboryl methyl zinc bromide solution was slowly moved with a syringe to the vial containing the substrate. The reactants were taken outside from a glove box after closing a cap of the vial and reacted at 60° C. for 3 hours. When the reaction was complete, the reaction solution was filtered with Celite and then washed with ethylacetate (50 mL) to primarily remove a catalyst. Then, a product therefrom was purified through column chromatography after removing a solvent therefrom with a rotary vacuum evaporator.

$^1$H-NMR (500 MHz, CDCl$_3$)[ppm] δ=7.18-7.17 (d, J=8.7 Hz, 2H), 6.78-6.76 (d, J=8.7 Hz, 2H), 3.76 (s, 3H), 2.23 (s, 1H), 1.22-1.21 (d, J=6.6 Hz, 24H).

Examples 3 to 10

Compound 3a was prepared according to a similar method to that of Example 2, except that a kind of the ligand (a phosphine-based compound) or the solvent were changed. Each specific reaction condition is shown in Table 1.

Examples 11 and 12

Compound 3a was prepared according to a similar method to that of Example 2, except that an amount of the catalyst and the ligand (a phosphine-based compound) were changed. Each specific reaction condition is shown in Table 1.

Comparative Example 1

Compound 3a was prepared according to a similar method to that of Example 2, except that a kind of the ligand (a phosphine-based compound) was changed. Each specific reaction condition is shown in Table 1.

TABLE 1

| | Ligand | Solvent | Yield (%) |
|---|---|---|---|
| Example 2 | PPh$_3$ | THF | 53 |
| Example 3 | P(p-CF$_3$C$_6$H$_4$)$_3$ | THF | 26 |
| Example 4 | P(p-tolyl)$_3$ | THF | 68 |
| Example 5 | P(p-OMeC$_6$H$_4$)$_3$ | THF | 62 |
| Example 6 | P(o-tolyl)$_3$ | THF | 99 |
| Example 7 | PCy$_3$ | THF | 74 |
| Comparative Example 1 | dppf | THF | <1 |
| Example 8 | P(o-tolyl)$_3$ | 1,4-dioxane | 60 |
| Example 9 | P(o-tolyl)$_3$ | toluene | 45 |
| Example 10 | P(o-tolyl)$_3$ | 1,2-dichloroethylene | 15 |
| Reference Example | P(o-tolyl)$_3$ | THF | <1 |
| Example 11 | P(o-tolyl)$_3$ | THF | 99 |

*PPh$_3$: triphenyl phosphine
*P(p-CF$_3$C$_6$H$_4$)$_3$: tris(4-trifluoromethylphenyl) phosphine
*P(p-tolyl)$_3$: tri-para-tolyl phosphine
*P(p-OMeC$_6$H$_4$)$_3$: tris(4-methoxyphenyl) phosphine
*P(o-tolyl)$_3$: tri-ortho-tolyl phosphine
*PCy$_3$: tricyclohexyl phosphine
*dppf: 1,1'-bis(diphenylphosphino)ferrocene
*THF: tetrahydrofuran
*Reference Example: reaction temperature was changed (60° C. → 25° C.)
*Example 11: 0.5 mol % Pd$_2$(dba)$_3$ and 1 mol % ligand (PPh$_3$)

Examples 12 to 24

Compound 3 was prepared according to a similar method to that of Example 11, except that a compound shown in Table 2 was used instead of the 4-bromoanisole 1a.

A structure and $^1$H-NMR of the synthesized compound are shown in Table 2.

TABLE 2

| | Compound 3 | Yield (%), ¹H-NMR |
|---|---|---|
| Example 12 | 3b (phenyl-CH(Bpin)₂) | 93% (500 MHz, CDCl₃) [ppm] δ = 7.30-7.26 (m, 2H), 7.23-7.20 (dd, J = 10.5 Hz, 4.9 Hz, 2H), 7.09-7.06 (m, 1H), 2.30 (s, 1H), 1.23-1.22 (d, J = 7.4 Hz, 24H). |
| Example 13 | 3c (4-Me-C₆H₄-CH(Bpin)₂) | 92% (500 MHz, CDCl₃) [ppm] δ = 7.17-7.16 (d, J = 7.9 Hz, 2H), 7.03-7.02 (d, J = 7.9 Hz, 2H), 2.29 (s, 3H), 2.26 (s, 1H), 1.23-1.22 (d, J = 6.7 Hz, 24 H). |
| Example 14 | 3d (4-Ph-C₆H₄-CH(Bpin)₂) | 65% (500 MHz, CDCl₃) [ppm] δ = 7.62-7.60 (dd, J = 8.2 Hz, 1.1 Hz, 2H), 7.49-7.48 (d, J = 8.3 Hz, 1H), 7.43-7.40 (t, J = 7.7 Hz, 2H), 7.37-7.35 (d, J = 8.3 Hz, 1H), 7.32-7.31 (m, 1H). |
| Example 15 | 3e (4-CF₃-C₆H₄-CH(Bpin)₂) | 60% (500 MHz, CDCl₃) [ppm] δ = 7.46-7.45 (d, J = 8.1 Hz, 2H), 7.36-7.34 (d, J = 8.1 Hz, 1H), 2.37 (s, 2H), 1.24-1.22 (d, J = 9.5 Hz, 24H). |
| Example 16 | 3f (4-F-C₆H₄-CH(Bpin)₂) | 78% (500 MHz, CDCl₃) [ppm] δ = 7.22-7.19 (m, 2H), 6.91-6.87 (t, J = 8.8 Hz, 2H), 2.27 (s, 1H), 1.23-1.21 (dd, J = 21.3 Hz, 7.1 Hz, 24H). |
| Example 17 | 3g (4-Cl-C₆H₄-CH(Bpin)₂) | 70% (500 MHz, CDCl₃) [ppm] δ = 7.20-7.16 (m, 4H), 2.26 (s, 12H), 1.22-1.21 (d, J = 8.5 Hz, 24H). |
| Example 18 | 3h (4-TBSO-C₆H₄-CH(Bpin)₂) | 78% (500 MHz, CDCl₃) [ppm] δ = 7.12-7.11 (d, J = 8.5 Hz, 2H), 6.70-6.68 (d, J = 8.5 Hz, 2H), 2.23 (s, 1H), 1.22-1.21 (d, J = 6.9 Hz, 24H), 0.96 (s, 9H), 0.17 (s, 3 Hz, 6H). |

TABLE 2-continued

| | Compound 3 | Yield (%), $^1$H-NMR |
|---|---|---|
| Example 19 | 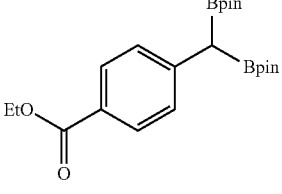<br>3i | 68% (500 MHz, CDCl$_3$) [ppm] δ 7.90-7.88 (d, J = 8.3 Hz, 2H), 7.32-7.31 (d, J = 8.3 Hz, 2H), 4.35-4.31 (q, J = 7.1 Hz, 2H), 2.37 (s, 1H), 1.37-1.34 (t, J = 7.1 Hz, 3H), 1.22-1.20 (d, J = 10.1 Hz, 24H). |
| Example 20 | 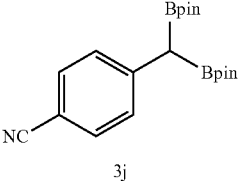<br>3j | 60% (500 MHz, CDCl$_3$) [ppm] δ 7.53-7.51 (d, J = 8.3 Hz, 2H), 7.37-7.35 (d, J = 8.2 Hz, 1H), 2.39 (s, 1H), 1.23-1.21 (d, J = 10.7 Hz, 12H). |
| Example 21 | 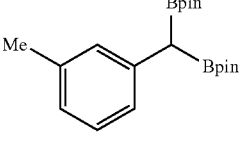<br>3k | 90% (500 MHz, CDCl$_3$) [ppm] δ 7.12--7.10 (m, 2H), 7.05 (s, 1H), 6.90-6.89 (dd, J = 3.8 Hz, 1.8 Hz, 1H), 2.30 (s, 3H), 2.27 (s, 1H), 1.24-1.23 (d, J = 6.7 Hz, 24H). |
| Example 22 | 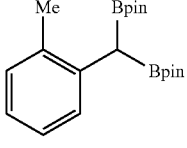<br>3l | 89% (500 MHz, CDCl$_3$) [ppm] δ = 7.47-7.46 (d, J = 7.7 Hz, 1H), 7.12-7.08 (dd, J = 12.4 Hz, J = 6.8 Hz, 2H), 7.03-6.99 (m, 1H), 2.41 (s, 1H), 2.26 (s, 3H), 1.25-1.24 (d, J = 5.4 Hz, 24H). |
| Example 23 | 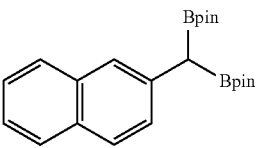<br>3m | 98% (500 MHz, CDCl$_3$) [ppm] δ = 7.77-7.68 (m, 4H), 7.48-7.46 (dd, J = 8.5 Hz, J = 1.8 Hz, 1H), 7.41-7.34 (m, 1H), 2.48 (s, 1H), 1.25-1.23 (d, J = 10.3 Hz, 12H). |
| Example 24 | 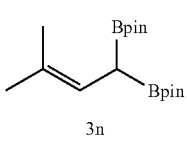<br>3n | 75% (500 MHz, CDCl$_3$) [ppm] δ = 5.37-5.35 (d, J = 9.1 Hz, 1H), 1.83-1.81 (d, J = 9.0 Hz, 1H), 1.68 (s, 3H), 1.54 (s, 3H), 1.21 (s, 24H). |
| Example 25 | 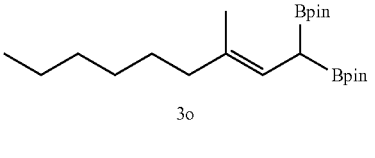<br>3o | 75%, (500 MHz, CDCl$_3$) δ = 5.37-5.35 (d, J = 9.4 Hz, 1H), 1.99-1.96 (t, J = 7.4 Hz, 2H), 1.84-1.82 (d, J = 9.4 Hz, 1H), 1.52 (s, 3H), 1.35-1.31 (m, 2H), 1.28-1.23 (m, 6H), 1.22 (s, 12H), 1.21 (s, 12H), 0.87-0.85 (t, J = 6.9 Hz, 3H). |
| Example 26 | 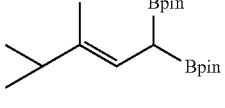<br>3p | 78%, (500 MHz, CDCl$_3$) δ = 5.44-5.43 (d, J = 9.0 Hz, 1H), 1.80-1.78 (d, J = 9.0 Hz, 1H), 1.55 (s, 3H), 1.21 (s, 12H), 1.20 (s, 12H), 1.01 (s, 9H). |

TABLE 2-continued

| | Compound 3 | Yield (%), ¹H-NMR |
|---|---|---|
| Example 27 | 3q | 71%, (500 MHz, CDCl₃) δ = 5.40-5.38 (d, J = 9.1 Hz, 1H), 1.92-1.87 (m, 1H), 1.82-1.80 (d, J = 9.1 Hz, 1H), 1.71-1.69 (m, 2H), 1.64-1.59 (m, 3H), 1.50-1.50 (d, J = 0.7 Hz, 3H), 1.28-1.23 (m, 2H), 1.21 (s, 12H), 1.20 (s, 12H), 1.18-1.08 (m, 3H). |
| Example 28 | 3r | 76%, (500 MHz, CDCl₃) δ = 7.42-7.40 (m, 2H), 7.49-7.26 (m, 2H), 7.18-7.15 (m, 1H), 6.11-6.09 (m, 1H), 2.09-2.07 (d, J = 9.9 Hz, 1H), 1.99-1.99 (d, J = 1.3 Hz, 3H), 1.25 (s, 12H), 1.24 (s, 12H). |
| Example 29 | 3s | 85%, (500 MHz, CDCl₃) δ = 5.33-5.31 (d, J = 8.7 Hz, 1H), 2.08-2.03 (m, 4H), 1.85-1.83 (d, J = 8.7 Hz, 1H), 1.48-1.46 (d, J = 7.8 Hz, 6H), 1.22 (s, 24H). |
| Example 30 | 3t | 79%, (500 MHz, CDCl₃) δ = 5.41-5.39 (d, J = 9.5 Hz, 1H), 2.21-2.14 (m, 4H), 1.82-1.80 (d, J = 9.5 Hz, 1H), 1.54-1.49 (m, 4H), 1.46-1.45 (d, J = 2.7 Hz, 4H), 1.22 (s, 12H), 1.21 (s, 12H). |

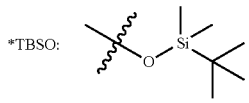

*TBSO:

*Bpin: , pinacolboronylester

*Examples 12 to 24: 1 mol % Pd₂(dba)₂, 2 mol % ligand (P(o-tolyl)₃), THF, 60° C., 3 hr

Example 25

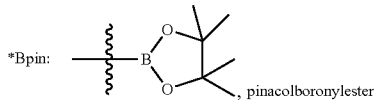 [SMILES: *B1OC(C)(C)C(C)(C)O1]

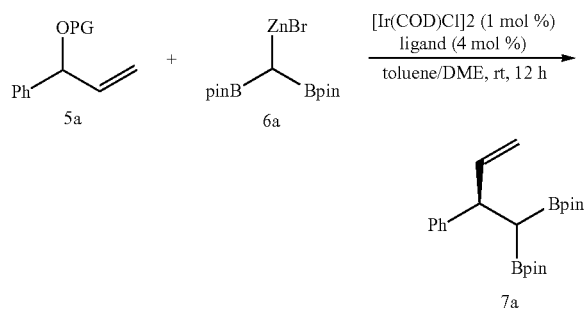

Anhydrous zinc bromide (1.2 eq, 0.24 mmol, 54 mg) as an additive and the purified 1,1-diobrylmethyl lithium (1.2 eq, 0.24 mmol, 66 mg) were put in a 4-dram vial, 1,2-dimethoxyethane (0.5 mL) was added thereto, and the obtained mixture was stirred for 30 minutes to prepare a 1,1-diboryl methyl zinc bromide solution. Subsequently, bis(1,5-cyclooctadiene)diiridium (I) dichloride (2.0 mol %, 4.0 μmol, 2.7 mg) and a phosphorous-containing chiral ligand (L1, 8.0 mol %, 16 μmol, 8.1 mg) were put in another 4-dram vial and then stirred to produce a catalyst in advance. Lastly, tert-butyl-(1-phenylallyl)carbonate (0.2 mmol, 47 mg) used as a substrate and a stirring magnet were put in another 4-dram vial, the in-advance-produced catalyst solution and a 1,1-diboryl methyl zinc bromide solution were moved to the vial containing the substrate. A reaction thereof was performed in a dark room at room temperature for 12 hours. When the reaction was complete, the reaction solution was silica-filtered and washed with diethylether (40 mL) to primarily remove the catalyst. After removing the solvent under decompression, a product therein was purified through column chromatography. Optical selectivity of the reaction was determined from HPLC (CHIRALPAK IA, Hexane: IPrOH=98:2, 1 mL/min) (yield=89% (99% ee)).

¹H-NMR (500 MHz, CDCl₃)[ppm] δ=7.24-7.20 (m, 4H), 7.12-7.09 (m, 1H), 5.99-5.93 (ddd, J=17.3, 10.1, 7.3 Hz, 1H), 5.02-4.98 (dt, J=17.0, 1.5 Hz, 1H), 4.89-4.86 (dt, J=10.1, 1.4 Hz, 1H), 3.76-3.72 (dd, J=2.4, 7.3 Hz, 1H), 1.46-1.44 (d, J=12.4 Hz, 1H), 1.24 (s, 6H), 1.22 (s, 6H), 0.96 (s, 6H), 0.90 (s, 6H).

Example 26

Compound 7a was prepared according to a similar method to that of Example 25, except that tert-butyl-(1-phenylallyl) carbonate was used in an amount of 5.0 mmol (yield=82% (99% ee)).

Examples 27 to 30

Compound 7a was prepared according to a similar method to that Example 25, except that the reaction conditions were changed as shown in Table 3.

Comparative Examples 2 to 6

Compound 7a was prepared according to a similar method to that of Example 25, except that the reaction conditions were changed as shown in Table 3.

Comparative Example 7

Compound 7a was prepared according to a similar method to that of Example 25, except that the reaction was performed according to the following reaction conditions.

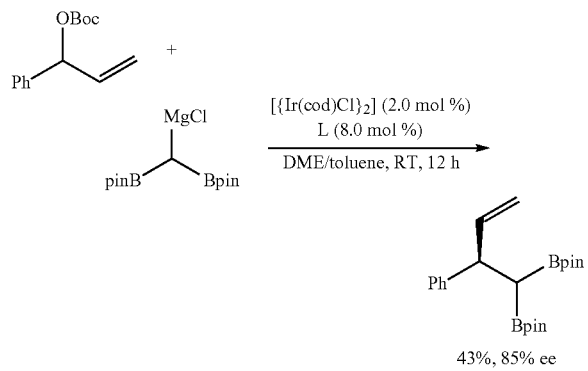

When a diboron compound substituted with magnesium through a reaction with MgCl$_2$ was used, the compound showed reactivity regarding a basic reaction substrate but sharply deteriorated ee %.

Comparative Example 8

Compound 7a was prepared according to a similar method to that of Example 25, except that the reaction was performed under the following reaction conditions.

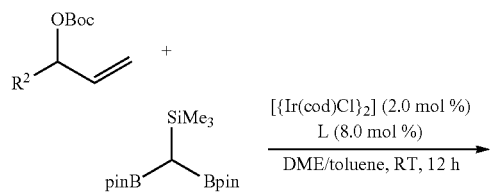

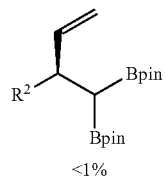

<1%

When 1,1-diboryl(methyl)trimethylsilane was used as a reaction agent, a reaction did not proceed at all, but the reaction agent still remained.

TABLE 3

|  | Protecting Group | Solvent | Additive | Ligand | Yield (%) | ee (%) |
|---|---|---|---|---|---|---|
| Example 27 | Boc | DME/toluene | ZnBr$_2$ | L1 | 90 | 99 |
| Example 28 | Boc | THF/toluene | ZnBr$_2$ | L1 | 70 | 99 |
| Example 29 | Boc | DME/toluene | ZnCl$_2$ | L1 | 81 | 99 |
| Example 30 | Boc | DME/toluene | ZnBr$_2$ | L1 | 82 | 99 |
| Comparative Example 2 | Boc | DME/toluene | ZnI$_2$ | L1 | <1 | — |
| Comparative Example 3 | Ac | DME/toluene | ZnBr$_2$ | L1 | 23 | 99 |
| Comparative Example 4 | OP(OEt)$_2$ | DME/toluene | ZnBr$_2$ | L1 | <1 | — |
| Comparative Example 5 | Boc | DME/toluene | ZnBr$_2$ | L2 | <1 | — |
| Comparative Example 6 | Boc | DME/toluene | ZnBr$_2$ | L3 | <1 | — |
| Comparative Example 7 | Boc | DME/toluene | MgCl$_2$ | L1 | 43 | 85 |
| Comparative Example 8 | Boc | DME/toluene | Si XMe$_3$ | L1 | <1 | — |

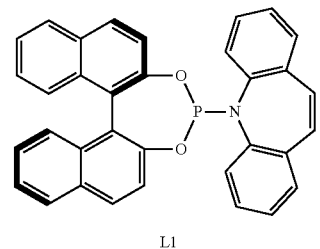

L1

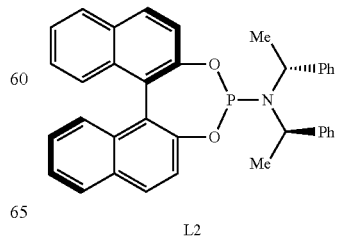

L2

TABLE 3-continued

| Protecting Group | Solvent | Additive | Ligand | Yield (%) | ee (%) |
|---|---|---|---|---|---|

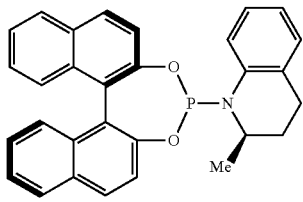

L3

*Boc: tert-Butoxy carbonyl
*Example 29: 2.0 mol % [Ir(cod)Cl₂], 8.0 mol % L1
*X: Cl or Br Examples 31 to 41

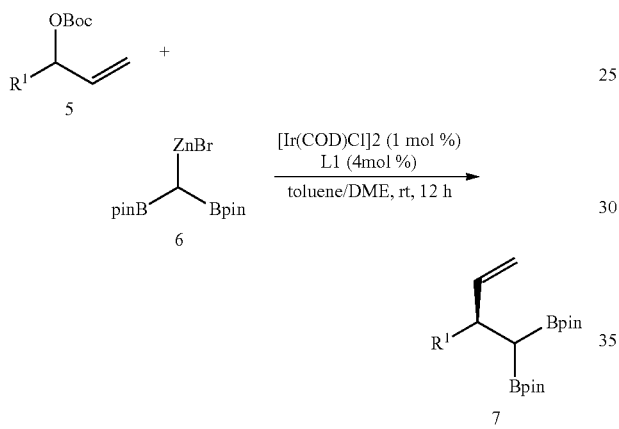

Compound 7 was prepared according to a similar method to that of Example 25, except that Compound 5 was used instead of Compound 5a.

Comparative Example 9

Compound 7 was prepared according to the manufacturing method of Example 25, by using Compound 5 instead of Compound 5a and Compound 6b instead of Compound 6.

A structure and $^1$H-NMR of the synthesized compound are shown in Table 4.

TABLE 4

| | Compound 7 | Yield (%), ee (%), $^1$H-NMR |
|---|---|---|
| Comparative Example 9 | 7b | <1% |
| Example 31 | 7b | 87%, 99% ee (500 MHz, CDCl₃) [ppm] δ = 7.15-7.13 (d, J = 8.7 Hz, 2H), 6.79-6.77 (d, J = 8.7 Hz, 2H), 5.97-5.90 (ddd, J = 17.2 Hz, 10.1 Hz, 7.2 Hz, 1H), 4.99-4.95 (dt, J = 16.9 Hz, 1.5 Hz, 1H), 4.86-4.84 (dt, J = 10.2 Hz, 1.3 Hz, 1H), 3.75 (s, 3H), 3.72-3.68 (dd, J = 12.4 Hz, 7.3 Hz, 1H), 1.41-1.39 (d, J = 12.4 Hz, 1H), 1.24 (s, 6H), 1.22 (s, 6H), 0.98 (s, 6H), 0.93 (s, 6H). |

TABLE 4-continued

| | Compound 7 | Yield (%), ee (%), $^1$H-NMR |
|---|---|---|
| Example 32 | 7c (4-Me-C$_6$H$_4$ derivative with vinyl, Bpin, Bpin) | 95%, 99% ee (500 MHz, CDCl$_3$) [ppm] δ = 7.12-7.10 (d, J = 8.2 Hz, 2H), 7.04-7.02 (d, J = 7.8 Hz, 2H), 5.98-5.91 (ddd, J = 17.2 Hz, 10.1 Hz, 7.3 Hz, 1H), 5.02-4.98 (dt, J = 17.1 Hz, 1.5 Hz, 1H), 4.87-4.84 (dt, J = 10.1 Hz, 1.3 Hz, 1H), 2.26 (s, 3H), 1.43-1.41 (d, J = 12.4 Hz, 1H), 1.24 (s, 6H), 1.22 (s, 6H), 0.97 (s, 6H), 0.92 (s, 6H). |
| Example 33 | 7d (Me derivative with vinyl, Bpin, Bpin) | 46%, 80% ee (500 MHz, CDCl$_3$) [ppm] δ = 5.82-5.75 (ddd, J = 17.5 Hz, 10.2 Hz, 7.6 Hz, 1H), 4.98-4.94 (dt, J = 17.1 Hz, 1.5 Hz, 1H), 4.81-4.79 (dd, J = 10.2 Hz, 1.8 Hz, 1H), 2.62-2.54 (dt, J = 10.5 Hz, 6.8 Hz, 1H), 1.23 (s, 6H), 1.22 (s, 6H), 1.20 (s, 6H), 1.19 (s, 6H), 1.04 (d, J = 6.7 Hz, 3H), 0.77 (d, J = 10.6 Hz, 1H). |
| Example 34 | 7e (4-F$_3$C-C$_6$H$_4$ derivative with vinyl, Bpin, Bpin) | 42%, 99% ee (500 MHz, CDCl$_3$) [ppm] δ = 7.50-7.48 (d, J = 8.1 Hz, 2H), 7.35-7.33 (d, J = 8.0 Hz, 2H), 5.97-5.90 (ddd, J = 17.2 Hz, 10.2 Hz, 7.2 Hz, 1H), 5.03-5.00 (m, 1H), 4.94-4.91 (dd, J = 10.2 Hz, 1.3 Hz, 1H), 3.83-3.79 (dd, J = 12.4 Hz, 7.2 Hz, 1H), 1.45-1.42 (d, J = 12.3 Hz, 1H), 1.24 (s, 6H), 1.22 (s, 6H), 0.97 (s, 6H), 0.90 (s, 6H). |
| Example 35 | 7f (4-Br-C$_6$H$_4$ derivative with vinyl, Bpin, Bpin) | 81%, 99% ee (500 MHz, CDCl$_3$) [ppm] δ = 7.36-7.33 (m, 2H), 7.12-7.09 (m, 2H), 5.94-5.87 (ddd, J = 17.2 Hz, 10.1 Hz, 7.2 Hz, 1H), 5.00-4.96 (dt, J = 17.0 Hz, 1.5 Hz, 1H), 4.90-4.87 (dt, J = 10.1 Hz, 1.3 Hz, 1H), 3.73-3.69 (dd, J = 12.3 Hz, 7.2 Hz, 1H), 1.39-1.37 (d, J = 12.3 Hz, 1H), 1.23 (s, 6H), 1.21 (s, 6H), 0.99 (s, 6H), 0.93 (s, 6H). |
| Example 36 | 7g (4-F-C$_6$H$_4$ derivative with vinyl, Bpin, Bpin) | 87%, 99% ee (500 MHz, CDCl$_3$) [ppm] δ = 7.20-7.16 (m, 2H), 6.94-6.89 (m, 2H), 5.96-5.89 (ddd, J = 17.2 Hz, 10.2 Hz, 7.2 Hz, 1H), 4.99-4.95 (dt, J = 17.1 Hz, 1.5 Hz, 1H), 4.89-4.86 (dt, J = 10.1 Hz, 1.4 Hz, 1H), 3.75-3.71 (m, 1H), 1.40-1.38 (d, J = 12.4 Hz, 1H), 1.24 (s, 6H), 1.22 (s, 6H), 0.98 (s, 6H), 0.92 (s, 6H). |
| Example 37 | 7h (4-MeO$_2$C-C$_6$H$_4$ derivative with vinyl, Bpin, Bpin) | 58%, 99% ee (500 MHz, CDCl$_3$) [ppm] δ = 7.91-7.90 (d, J = 8.3 Hz, 2H), 7.30-7.28 (d, J = 8.3 Hz, 2H), 5.96-5.89 (ddd, J = 17.2 Hz, 10.2 Hz, 7.3 Hz, 1H), 5.01-4.98 (d, J = 17.1 Hz, 1H), 4.91-4.89 (d, J = 10.1 Hz, 1H), 3.87 (s, 3H), 3.82-3.78 (dd, J = 12.3 Hz, 7.3 Hz, 1H), 1.45-1.43 (d, J = 12.3 Hz, 1H), 1.24 (s, 6H), 1.21 (s, 6H), 0.97 (s, 6H), 0.89 (s, 6H). |
| Example 38 | 7i (3-MeO-C$_6$H$_4$ derivative with vinyl, Bpin, Bpin) | 92%, 99% ee (500 MHz, CDCl$_3$) [ppm] δ = 7.15-7.11 (t, J = 7.9 Hz, 1H), 6.83-6.79 (m, 2H), 6.67-6.65 (m, 1H), 5.98-5.91 (ddd, J = 17.3 Hz, 10.1 Hz, 7.4 Hz, 1H), 5.03-4.99 (dt, J = 17.0 Hz, 1.5 Hz, 1H), 3.75 (s, 3H), 3.73-3.69 (dd, J = 10.1 Hz, 1.3 Hz, 1H), 4.88-4.86 (dt, J = 10.1 Hz, 1.3 Hz, 1H), 3.75 (s, 3H), 3.73-3.69 (dd, J = 12.4 Hz, 7.4 Hz, 1H), 1.44- |

TABLE 4-continued

| | Compound 7 | Yield (%), ee (%), ¹H-NMR |
|---|---|---|
| | | 1.41 (d, J = 12.4 Hz, 1H), 1.23 (s, 6H), 1.21 (s, 6H), 0.98 (s, 6H), 0.92 (s, 6H). |
| Example 39 | 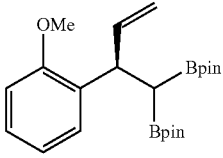<br>7j | 49%, 99% ee (500 MHz, CDCl₃) [ppm] δ = 7.19-7.17 (dd, J = 7.5 Hz, 1.7 Hz, 1H), 7.11-7.08 (td, J = 7.7 Hz, 1.7 Hz, 1H), 6.87-6.83 (td, J = 7.5 Hz, 1.1 Hz, 1H), 6.79-6.77 (dd, J = 8.2 Hz, 1.1 Hz, 1H), 6.03-5.96 (ddd, J = 17.2 Hz, 10.1 Hz, 7.2 Hz, 1H), 4.98-4.94 (dt, J = 17.0 Hz, 1.7 Hz, 1H), 4.84-4.81 (ddd, J = 10.1 Hz, 1.9 Hz, 1.1 Hz, 1H), 4.20-4.16 (dd, J = 12.6 Hz, 7.3 Hz, 1H), 3.80 (s, 3H), 1.63-1.60 (d, J = 12.6 Hz, 1H), 1.24 (s, 6H), 1.22 (s, 6H), 0.98 (s, 6H), 0.86 (s, 6H). |
| Example 40 | 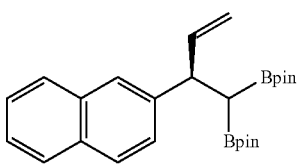<br>7k | 84%, 99% ee (500 MHz, CDCl₃) [ppm] δ = 7.77-7.70 (m, 4H), 7.43-7.36 (m, 3H), 6.08-6.01 (ddd, J = 17.2 Hz, 10.1 Hz, 7.2 Hz, 1H), 5.09-5.05 (dt, J = 17.0 Hz, 1.5 Hz, 1H), 4.95-4.92 (dt, J = 10.2 Hz, 1.4 Hz, 1H), 3.97-3.93 (dd, J = 12.3 Hz, 7.2 Hz, 1H), 1.58-1.55 (d, J = 12.4 Hz, 1H), 1.27 (s, 6H), 1.25 (s, 6H), 0.90 (s, 6H), 0.83 (s, 6H). |
| Example 41 | 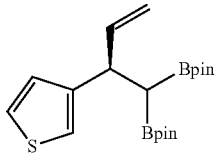<br>7l | 93%, 99% ee (500 MHz, CDCl₃) [ppm] δ = 7.17-7.15 (dd, J = 4.9 Hz, 3.0 Hz, 1H), 7.00-6.99 (dd, J = 3.0 Hz, 1.2 Hz, 1H), 6.95-6.94 (dd, J = 5.0 Hz, 1.3 Hz, 1H), 5.97-5.90 (ddd, J = 17.3 Hz, 10.1 Hz, 1H), 4.89-4.86 (dt, J = 10.0 Hz, 1.3 Hz, 1H), 3.88-3.85 (dd, J = 12.2 Hz, 7.4 Hz, 1H), 1.38-1.36 (d, J = 12.2 Hz, 1H), 1.23 (s, 6H), 1.21 (s, 6H), 1.04 (s, 6H), 0.99 (s, 6H). |
| Example 42 | 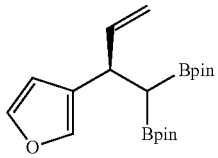<br>7m | 75%, 99% ee (500 MHz, CDCl₃) [ppm] δ = 7.28-7.24 (m, 3H), 6.28 (dd, J = 1.8, 0.9 Hz, 1H), 5.95-5.88 (ddd, J = 17.2, 10.1, 7.4 Hz, 1H), 5.04-5.00 (dt, J = 17.0, 1.5 Hz, 1H), 4.91-4.88 (dt, J = 10.1, 1.3 Hz, 1H), 3.68-3.64 (dd, J = 12.0, 7.4 Hz, 1H), 1.26 (m, 1H), 1.23 (s, 6H), 1.21 (s, 6H), 1.10 (s, 6H), 1.06 (s, 6H) |
| Example 43 | 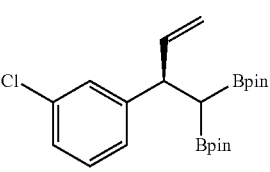<br>7n | 67%, 99% ee (500 MHz, CDCl₃) [ppm] δ = 7.24-7.23 (m, 1H), 7.17-7.14 (m, 1H), 7.11-7.08 (m, 2H), 5.96-6.89 (ddd, J = 17.2, 10.1, 7.2 Hz, 1H), 5.03-4.99 (dt, J = 17.2, 1.5 Hz, 1H), 4.93-4.90 (dt, J = 10.1, 1.3 Hz, 1H), 3.74-3.70 (dd, J = 12.3, 7.2 Hz, 1H), 1.39-1.37 (d, J = 12.3 Hz, 1H), 1.24 (s, 6H), 1.21 (s, 6H), 1.00 (s, 6H), 0.94 (s, 6H) |

TABLE 4-continued

| | Compound 7 | Yield (%), ee (%), $^1$H-NMR |
|---|---|---|
| Example 44 | 7o | 70%, 99% ee (500 MHz, CDCl$_3$) [ppm] δ = 7.98-7.96 (d, J = 8.2 Hz, 1H), 7.78-7.76 (d, J = 8.4 Hz, 2H), 7.61-7.59 (d, J = 7.9 Hz, 1H), 7.41 (s, 1H), 7.30-7.26 (m, 1H), 7.22-7.18 (m, 3H), 5.95-5.88 (ddd, J = 17.4, 10.1, 7.6 Hz, 1H), 5.05-5.01 (dt, J = 17.0, 1.4 Hz, 1H), 4.93-4.91 (dt, J = 10.1, 1.3 Hz, 1H), 4.00-3.96 (dd, J = 11.9, 7.6 Hz, 1H), 2.35 (s, 3H), 1.51-1.49 (d, J = 11.9 Hz, 1H), 1.27 (s, 6H), 1.26 (s, 6H), 1.03 (s, 6H), 0.91 (s, 6H) |

\*Me: methyl
\*MeO: methoxy
\*Ts: para-toluenesulfonyl

Compound 7 of the 1,1-diboronate ester compound prepared in the examples may be applied to various known synthetic methods. For example, Compound 7a may be modified into various compounds according to reaction conditions as follows.

Application Examples

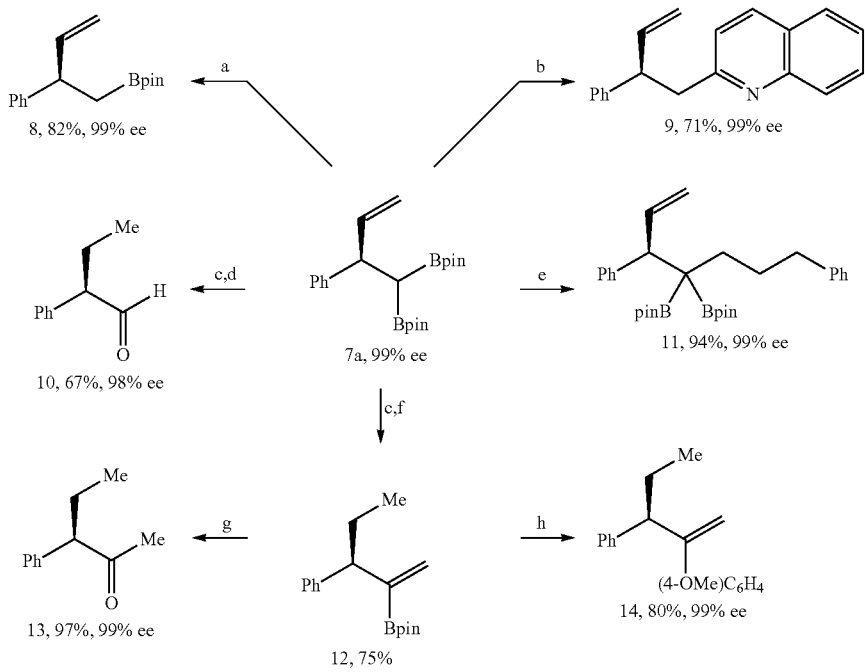

Reaction Conditions
[a] NaOtBu, MeOH, THF; RT, 6 hr
[b] quinolone-N-oxide, NaOMe, toluene; 120° C., 3 h
[c] cat. Pd/c, H$_2$, MeOH; RT, 2 h
[d] H$_2$O$_2$, NaHCO$_3$, THF/H$_2$O; 0° C.→RT, 3 h
[e] LDA, 3-phenylpropyl bromide, THF; 0° C.→RT, 6 h
[f] LDA, CH$_2$I$_2$, THF; 0° C.→60° C., 48 h
[g] NaBO$_3$.4H$_2$O, THF/H$_2$O; 0° C.→RT, 3 h
[h] cat. Pd(PPh$_3$)$_4$, 4-iodoanisole, NaOH, 1,4-dioxane/H$_2$O; 100° C., 6 h While the present invention has been particularly shown and described with reference to exemplary embodiments thereof, it will be understood by those of ordinary skill in the art that various modifications in form and details may be made therein without departing from the spirit and scope of the invention as defined by the appended claims. Accordingly, modifications of the embodiments of the present disclosure will not depart from the scope of the present disclosure.

What is claimed is:

1. A compound represented by Chemical Formula 1:

[Chemical Formula 1]

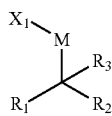

wherein, in Chemical Formula 1,

R$_1$ and R$_2$ are independently *—B(R$_{41}$)(R$_{42}$), wherein R$_{41}$ and R$_{42}$ are independently hydrogen, a hydroxy, a C1-C30 alkyl, or a C1-C30 alkoxy, or are linked with each other to form a ring;

R$_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

X$_1$ is a halogen;

the alkyl, the alkoxy, and the ring formed by linking with each other of R$_{41}$ and R$_{42}$ and the alkyl, the alkoxy, the alkenyl, the alkynyl, the cycloalkyl, the heterocycloalkyl, the aryl, and the heteroaryl of R$_3$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of R$_3$ independently comprise at least one heteroatom selected from B, N, O, S, Se, —P(=O)—, —C(=O)—, Si, and P.

2. The compound of claim 1, wherein R$_1$ and R$_2$ are independently hydroxyboronyl, pinacolboronyl ester, 2-pyrazol-5-yl aniline boronyl, benzo[1,3,2]dioxaborole, or 2,3-dihydro-1H-naphtho[1,8-de][1,3,2]diazaborinine.

3. The compound of claim 1, which is represented by Chemical Formula 9:

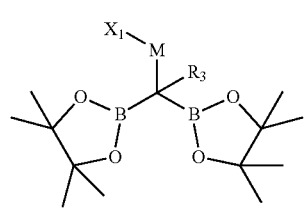

[Chemical Formula 9]

wherein, in Chemical Formula 9,

R$_3$ is hydrogen, a C1-C30 alkyl, a C2-C30 alkenyl, a C3-C30 cycloalkyl, or a C3-C30 heterocycloalkyl;

M is a zinc group metal;

X$_1$ is a halogen;

the alkyl, the alkenyl, the cycloalkyl, or the heterocycloalkyl of R$_3$ is further substituted with at least one substituent selected from a halogen, a hydroxy, a cyano, a C1-C30 alkyl, a C1-C30 haloalkyl, a C3-C30 cycloalkyl, a C3-C30 heterocycloalkyl, a C6-C30 aryl, and a C2-C30 heteroaryl; and the heterocycloalkyl and the heteroaryl of R$_3$ independently comprise at least one heteroatom selected from B, N, O, S, Se, —P(=O)—, —C(=O)—, Si, and P.

4. The compound of claim 1, wherein R$_3$ is hydrogen, a C1-C7 alkyl, or a C2-C7 alkenyl, or the alkyl or the alkenyl of R$_3$ is further substituted with at least one substituent selected from a C1-C7 alkyl, a C1-C7 haloalkyl, a C3-C12 cycloalkyl, a C3-C12 heterocycloalkyl, a C6-C12 aryl, and a C6-C12 heteroaryl.

5. The compound of claim 1, wherein M is Zn.

6. The compound of claim 1, wherein X$_1$ is Br or Cl.

7. The compound of claim 1, wherein M-X$_1$ is Zn—Br or Zn—Cl.

8. A method of preparing a compound of Chemical Formula 1, comprising performing a dehydrogenation reaction of a compound of Chemical Formula 6 under a lithium base to prepare a compound of Chemical Formula 7, and reacting the compound of Chemical Formula 7 with a compound of Chemical Formula 8:

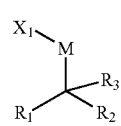

[Chemical Formula 1]

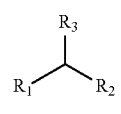

[Chemical Formula 6]

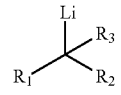

[Chemical Formula 7]

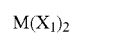

M(X$_1$)$_2$  [Chemical Formula 8]

wherein, in Chemical Formulae 1 and 6 to 8,

R$_1$ and R$_2$ are independently *—B(R$_{41}$)(R$_{42}$), wherein R$_{41}$ and R$_{42}$ are independently hydrogen, a hydroxy, a C1-C30 alkyl, or a C1-C30 alkoxy, or are linked with each other to form a ring;

R$_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

X$_1$ is a halogen;

the alkyl, the alkoxy, and the ring formed by linking with each other of R$_{41}$ and R$_{42}$ and the alkyl, the alkoxy, the alkenyl, the alkynyl, the cycloalkyl, the heterocycloalkyl, the aryl, and the heteroaryl of R$_3$ may independently be further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of R$_3$ independently comprise at least one heteroatom selected from B, N, O, S, Se, —P(=O)—, —C(=O)—, Si, and P.

9. The method of claim 8, wherein the lithium base is selected from butyl lithium, lithium dicyclohexylamide, lithium tetramethylpiperidide, lithium isopropylcyclohexylamide, and lithium diisopropylamide.

10. A method of preparing a 1,1-diboronate ester compound, comprising:

reacting a halogenated aromatic compound or a halogenated vinyl compound; a compound of Chemical Formula 1; and a monodentate ligand-containing transition metal compound under a solvent to prepare a compound of Chemical Formula 2:

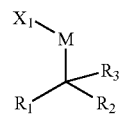

[Chemical Formula 1]

-continued

[Chemical Formula 2]

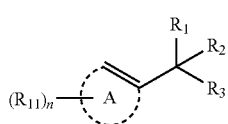

wherein, in Chemical Formulae 1 and 2, $R_1$ and $R_2$ are independently *—$B(R_{41})(R_{42})$, wherein $R_{41}$ and $R_{42}$ are independently hydrogen, a hydroxy, a C1-C30 alkyl, or a C1-C30 alkoxy, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

A is not present or is an aromatic ring;

$R_{11}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—Si$(R_{31})_3$, or —C(O)—$R_{32}$, wherein $R_{31}$ and $R_{32}$ are independently hydrogen, a hydroxy, a C1-C30 alkyl, or a C1-C30 alkoxy;

n is an integer ranging from 1 to 3, and when n is 2 or 3, each $R_{11}$ is the same or different;

the alkyl, the alkoxy, and the ring formed by linking with each other of $R_{41}$ and $R_{42}$, the alkyl, the alkoxy, the alkenyl, the alkynyl, the cycloalkyl, the heterocycloalkyl, the aryl, and the heteroaryl of $R_3$, the aromatic ring of A, and the alkyl, the alkoxy, the alkenyl, the alkynyl, the aryl, and the heteroaryl of $R_1$ are independently further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and the heteroaryl of $R_{11}$ independently include at least one heteroatom selected from B, N, O, S, Se, —P(=O)—, —C(=O)—, Si, and P.

11. The method of claim 10, wherein the reaction is performed at about 25° C. to about 100° C.

12. The method of claim 10, wherein the monodentate ligand-containing transition metal compound is a composite of a compound selected from [Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$[BF$_4$]$_2$, Pd$_2$(dba)$_3$, and [Pd(C$_3$H$_5$)Cl]$_2$, and a phosphine-based compound.

13. The method of claim 12, wherein the phosphine-based compound is selected from triphenylphosphine, tri-ortho-tolyl phosphine, tri-meta-tolyl phosphine, tri-para-tolyl phosphine, tris(4-trifluoromethylphenyl) phosphine, diphenyl(para-tolyl) phosphine, cyclohexyldiphenyl phosphine, tris(2,6-dimethoxyphenyl) phosphine, tris(4-methoxyphenyl) phosphine, trimesitylphosphine, tris-3,5-xylylphosphine, tricyclohexyl phosphine, tribenzyl phosphine, benzyldiphenyl phosphine, and diphenyl-normal-propyl phosphine.

14. The method of claim 10, wherein $R_1$ and $R_2$ are independently hydroxyboronyl, pinacolboronylester, 2-pyrazol-5-yl aniline boronyl, benzo[1,3,2]dioxaborole, or 2,3-dihydro-1H-naphtho[1,8-de][1,3,2]diazaborinine.

15. The method of claim 10, wherein the solvent is selected from aprotic solvents.

16. A method of preparing a 1,1-diboronate ester compound, comprising:

reacting a compound of Chemical Formula 5; a compound of Chemical Formula 1; and a monodentate ligand-containing transition metal compound under a solvent to prepare a compound of Chemical Formula 4:

[Chemical Formula 1]

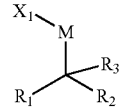

[Chemical Formula 4]

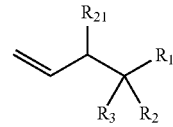

[Chemical Formula 5]

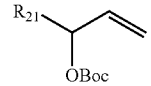

wherein, in Chemical Formulae 1, 4, and 5, $R_1$ and $R_2$ are independently *—$B(R_{41})(R_{42})$, wherein $R_{41}$ and $R_{42}$ are independently hydrogen, a hydroxy, a C1-C30 alkyl, or a C1-C30, or are linked with each other to form a ring;

$R_3$ is hydrogen, a C1-C30 alkyl, a C1-C30 alkoxy, a C2-C30 alkenyl, a C2-C30 alkynyl, a C3-C30 cycloalkyl, a C3-C30 heterocycloalkyl, a C6-C30 aryl, or a C2-C30 heteroaryl;

M is a zinc group metal;

$X_1$ is a halogen;

$R_{21}$ is hydrogen, a halogen, a hydroxy, a cyano, a C1-C30 alkyl, a C1-C30 alkoxy, a C2-C30 alkenyl, a C2-C30 alkynyl, a C6-C30 aryl, a C2-C30 heteroaryl, —O—Si$(R_{31})_3$, or —C(O)—$R_{32}$, wherein $R_{31}$ and $R_{32}$ are independently hydrogen, a hydroxy, a C1-C30 alkyl, or a C1-C30 alkoxy;

Boc is tert-butoxycarbonyl;

the alkyl, the alkoxy, and the ring formed by linking with each other of $R_{41}$ and $R_{42}$ and the alkyl, the alkoxy, the alkenyl, the alkynyl, the cycloalkyl, the heterocycloalkyl, the aryl, and the heteroaryl of $R_3$, and the alkyl, the alkoxy, the alkenyl, the alkynyl, the aryl, and the heteroaryl of $R_{21}$ are independently further substituted with at least one substituent selected from a halogen, a hydroxy, a cyano, a C1-C30 alkyl, a C1-C30 haloalkyl, a C1-C30 alkoxy, a C1-C30 aminoalkyl, a C3-C30 cycloalkyl, a C3-C30 heterocycloalkyl, a C6-C30 aryl, and a C2-C30 heteroaryl; and the heterocycloalkyl and the heteroaryl of $R_3$ and the heteroaryl of $R_{21}$ independently comprise at least one heteroatom selected from B, N, O, S, Se, —P(=O)—, —C(=O)—, Si, and P.

17. The method of claim 16, wherein the reaction is performed at about 10° C. to 35° C.

18. The method of claim 16, wherein the monodentate ligand-containing transition metal compound may be a composite of a compound selected from Rh(COD)Cl]$_2$, [Rh(COD)$_2$]X (X=BF$_4$, ClO$_4$, SbF$_6$, or CF$_3$SO$_3$), [Ir(COD)Cl]$_2$, [Ir(COD)$_2$]X (X=OMe, BF$_4$, ClO$_4$, SbF$_6$, or CF$_3$SO$_3$), Ru(COD)Cl$_2$, [Pd(CH$_3$CN)$_4$[BF$_4$]$_2$, Pd$_2$(dba)$_3$, and [Pd(C$_3$H$_5$)Cl]$_2$, with an aminophosphone-based compound.

19. The method of claim 18, wherein the aminophosphone-based compound is the following L1:

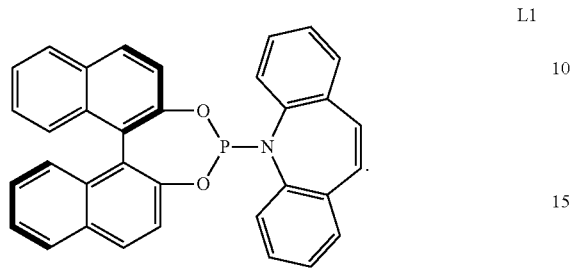

20. The method of claim 16, wherein R$_1$ and R$_2$ are independently hydroxyboronyl, pinacolboronylester, 2-pyrazol-5-yl aniline boronyl, benzo[1,3,2]dioxaborole or 2,3-dihydro-1H-naphtho[1,8-de][1,3,2]diazaborinine.

* * * * *